US011212333B1

(12) United States Patent
Duffy et al.

(10) Patent No.: US 11,212,333 B1
(45) Date of Patent: Dec. 28, 2021

(54) METHODS AND APPARATUS FOR SYNCHRONIZING TRANSCODED AND/OR TRANSRATED RTP PACKETS

(71) Applicant: Ribbon Communications Operating Company, Inc., Westford, MA (US)

(72) Inventors: Mark Duffy, Lexington, MA (US); M. Scott Corson, Gillette, NJ (US); Siddharth Gahlaut, Westford, MA (US); Tolga Asveren, Bordentown, NJ (US)

(73) Assignee: Ribbon Communications Operating Company, Inc., Westford, MA (US)

( * ) Notice: Subject to any disclaimer, the term of this patent is extended or adjusted under 35 U.S.C. 154(b) by 713 days.

(21) Appl. No.: 14/749,716

(22) Filed: Jun. 25, 2015

Related U.S. Application Data

(60) Provisional application No. 62/168,621, filed on May 29, 2015.

(51) Int. Cl.
*H04L 29/06* (2006.01)
*H04L 29/08* (2006.01)

(52) U.S. Cl.
CPC ............ *H04L 65/608* (2013.01); *H04L 67/10* (2013.01)

(58) Field of Classification Search
CPC .............................. H04L 65/608; H04L 67/10
USPC ...................................................... 709/231
See application file for complete search history.

(56) References Cited

U.S. PATENT DOCUMENTS

| 6,169,843 | B1 * | 1/2001 | Lenihan | H04N 9/8042 |
| | | | | 348/E5.005 |
| 6,857,130 | B2 * | 2/2005 | Srikantan | H04L 29/06 |
| | | | | 375/E7.025 |
| 7,313,236 | B2 * | 12/2007 | Amini | H04L 29/06027 |
| | | | | 380/217 |
| 8,462,946 | B2 * | 6/2013 | Doehla | G11B 27/10 |
| | | | | 380/212 |
| 9,236,091 | B2 * | 1/2016 | Doehla | H04N 21/2368 |

(Continued)

OTHER PUBLICATIONS

"ETSI TS 102 833 V1.1.1 (Nov. 2008); Digital Video Broadcasting (DVB); File Format Specification for the Storage and Playback of DVB Services" (Year: 2008).*

*Primary Examiner* — Esther B. Henderson
*Assistant Examiner* — Nazia Naoreen
(74) *Attorney, Agent, or Firm* — Straub & Straub; Stephen T. Straub; Michael P. Straub

(57) ABSTRACT

Methods and apparatus for synchronizing packet streams and in particular to the synchronization of transcoded and/or transrated Real-time Transport Protocol (RTP) packet streams, e.g., transcoded and/or transrated RTP packet streams carrying audio and/or video data. In one embodiment, a packet processing device receives packets of a first RTP packet stream and a first RTCP packet stream and generates a second RTP packet stream from the first RTP packet stream and generates a second RTCP packet stream from the first RTCP packet stream. The second RTP packet stream including packets with timestamps different than packets of the first RTP packet stream. The second RTCP packet stream including NTP timestamps received in or based on the NTP timestamps of the first RTCP packet stream and associated with RTP timestamps corresponding to content in the second RTP packet stream which was generated by transrating or trancoding content in the first RTP packet stream.

23 Claims, 16 Drawing Sheets

(56) References Cited

U.S. PATENT DOCUMENTS

2008/0049635 A1* 2/2008 Huang ................ H04L 43/0858
370/252
2012/0036277 A1* 2/2012 Stokking .................. H04N 7/24
709/231

* cited by examiner

GENERATE, AT THE PACKET PROCESSING DEVICE, A SECOND RTCP PACKET STREAM FROM THE RECEIVED FIRST RTCP PACKETS, SAID SECOND RTCP PACKET STREAM INCLUDING A SECOND RTCP PACKET INCLUDING A SECOND RTCP PACKET NTP TIMESTAMP VALUE WHICH IS ASSOCIATED IN SAID SECOND RTCP PACKET WITH A RTP TIMESTAMP VALUE OF SAID SECOND RTP PACKET STREAM, THE SECOND RTCP PACKET NTP TIMESTAMP VALUE CORRESPONDING TO CONTENT IN SAID FIRST AND SECOND RTP STREAMS WHICH IS THE SAME OR CONTENT IN SAID SECOND RTP PACKET STREAM WHICH WAS GENERATED BY TRANSRATING OR TRANSCODING CONTENT IN SAID FIRST RTP PACKET STREAM CORRESPONDING TO SAID SECOND RTCP PACKET NTP TIMESTAMP VALUE

1016

USE AT LEAST SOME FIRST RTCP PACKET NTP TIMESTAMP VALUES RECEIVED IN SAID FIRST RTCP PACKET STREAM AS SECOND RCTP PACKET NTP TIMESTAMP VALUES IN SAID SECOND RTCP PACKET STREAM

INCLUDE ONE OF THE RTCP PACKET NTP TIMESTAMP VALUES FROM THE FIRST RTCP PACKET STREAM IN THE SECOND RTCP PACKET AND A NEW RTP TIMESTAMP VALUE, SAID NEW RTP TIMESTAMP VALUE CORRESPONDING TO A PACKET IN THE SECOND RTP PACKET STREAM COMMUNICATING DATA GENERATED FROM A RTP PACKET OF THE FIRST PACKET STREAM WHICH INCLUDED A RTP TIMESTAMP VALUE WHICH IS DIFFERENT FROM SAID NEW RTP TIMESTAMP VALUE BUT WHICH COMMUNICATED CONTENT CORRESPONDING TO SAID ONE OF THE RTCP PACKET NTP TIMESTAMP VALUES

1018

1021

GENERATE NEW RTCP PACKET NTP TIMESTAMP VALUES FOR INCLUSION IN SAID SECOND RTCP PACKET STREAM BASED ON THE AMOUNT OF TIME TO WHICH CONTENT IN THE SECOND RTP PACKET STREAM CORRESPOND

1022

GENERATE SAID SECOND RTCP PACKET NTP TIMESTAMP VALUES FOR INCLUSION IN SAID SECOND RTCP PACKET STREAM BASED ON THE CONTENT INCLUDED IN SAID SECOND RTP PACKETS, SAID SECOND RTCP PACKET NTP TIMESTAMP VALUES BEING GENERATED SUCH THAT A RTCP PACKET NTP TIMESTAMP VALUE CORRESPONDS TO THE SAME CONTENT IN EITHER THE FIRST OR SECOND RTP CONTENT STREAMS

USE INTERPOLATION TO GENERATE AT LEAST ONE OF THE RTCP PACKET NTP TIMESTAMP VALUES OF THE SECOND RTCP STREAM

1024

GENERATE A RTP TIMESTAMP VALUE TO BE INCLUDED IN A RTCP PACKET OF SAID SECOND RTCP PACKET STREAM USING INTERPOLATION

1026

GENERATE A RTCP PACKET NTP TIMESTAMP VALUE TO BE INCLUDED IN A RTCP PACKET OF SAID SECOND RTCP PACKET STREAM USING INTERPOLATION

1028

(B) 1032

SECOND RTCP PACKET STREAM 1031

METHODS AND APPARATUS FOR SYNCHRONIZING TRANSCODED AND/OR TRANSRATED RTP PACKETS

RELATED APPLICATION

The present application claims the benefit of the filing date of U.S. Provisional Application Ser. No. 62/168,621 filed on May 29, 2015 which is hereby expressly incorporated by reference in its entirety.

FIELD

The present application relates to methods and apparatus for synchronizing packet streams and in particular to the synchronization of transcoded and/or transrated Real-time Transport Protocol (RTP) packet streams, e.g., transcoded and/or transrated RTP packet streams carrying audio and/or video data.

BACKGROUND

Synchronization, e.g., lip synchronization is the functionality of aligning audio and video streams, e.g., audio and video RTP packet streams, so that the end user is presented a coherent view. At a high level, there are two approaches to solving the problem of lip synchronization which will be discussed in connection with the transmission of Real-time Transport Protocol packet streams. The Real-time Transport Protocol and Real-time Transport Control Protocol are described in the Request For Comment (RFC) 3550 entitled "RTP: A Transport Protocol for Real-Time Applications" dated July 2003 published by the Internet Engineering Task Force. The first approach to lip synchronization includes deducting a relationship between the timestamps and arrival times of RTP packets for each stream separately and then using this information to synchronize the streams. The second approach including calculating the wall clock time for each RTP packet and synchronizing packets on both streams. This second approach requires the use of Real-time Transport Control Protocol (RTCP) and a common wall clock for the devices performing audio/video transrating and/or transcoding. A RTCP stream contains both wall clock and RTP timestamp information. This provides enough information for the receiver of the RTP packet streams and the RTCP packet streams to create a mapping from RTP time to the wall clock time. This mapping is used to find the original emitting wall clock time for each received RTP packet.

However, this second approach relies heavily on the receiver having accurate information about the original sending time for audio and video packets. The sending time of RTP packets is communicated by using RTP timestamps. RTP timestamps themselves do not directly convey information about the actual sending time. RTP timestamps are 32 bits long and indicate the sampling instance for the first octet of media in a packet indicated as a sampling period number. The sampling instant must be derived from a clock that increments monotonically and linearly in time to allow synchronization and jitter calculations. The initial sampling period number is arbitrary. As explained in the RTP: A Transport Protocol for Real-Time Applications RFC 3550, RTP timestamps from different media streams may, and in some do, advance at different rates and typically have independent, random offsets. While these timestamps may be sufficient to reconstruct the timing of a single stream, directly comparing RTP timestamps from different media is not effective for synchronization. Instead, for each medium the RTP timestamp is related to the sampling instant by pairing it with a timestamp from a referenced clock (wallclock) that represents the time when the data corresponding to the RTP timestamp was sampled. The reference clock (wallclock) is shared by all media to be synchronized. The timestamp pairs are not transmitted in every data packet, but at a lower rate in RTCP sending report (SR) packets. The sampling instant is chosen as the point of reference for the RTP timestamp because it is known to the transmitting endpoint and has a common definition for all media, independent of encoding delays or other processing. The purpose is to allow synchronized presentation of all media sampled at the same time.

As further described in the RFC 3550, when transmitting stored data rather than data sampled in real time, applications typically use a virtual presentation timeline derived from wallclock time to determine the next frame or other unit of each medium in the stored data should be presented. In such cases, the RTP timestamp would reflect the presentation time for each unit, i.e., the RTP timestamp for each unit would be related to the wallclock time at which the unit becomes current on the virtual presentation timeline. Actual presentation occurs some time later as determined by the receiver.

Drawing 101 of FIG. 1 illustrates an example of a timestamp at two instances in time for packets RTP-1 106 and RTP-2 112. Line 104 of FIG. 1 represents time line increasing from top to bottom. Legend 102 of FIG. 1 shows the sampling rate and one sampling period. The sampling rate for the RTP data stream is 8 KHz which gives one sampling period equal to 0.125 msec. At time 108 (T0) the RTP-1 (T0) packet has a timestamp 110 equal to 15687. At time 114 (T0+20 msec), the RTP-2 (T0+20 msec) packet has a timestamp 116 calculated by adding the timestamp at T0+(T0+20 ms)/sampling period). That is the timestamp 116 for RTP-2 (T0+20 ms)=15687+(20 ms/0.125 ms)=15847.

The actual time is found by making use of Real-time Transport Control Protocol (RTCP) packets. RTCP packets contain the sampling period number and the corresponding real time. In this way, the RTCP packets provide a binding between RTP timestamps and the absolute wall clock time. In the RTCP protocol, wall clock time (absolute date and time) is represented using the timestamp format of the Network Time Protocol (NTP), which is in seconds relative to 0 hours UTC (Coordinated Universal Time) on 1 Jan. 1900. The full resolution NTP timestamp is a 64-bit unsigned fixed-point number with the integer part in the first 32 bits and the fractional part in the last 32 bits. In the examples herein the timestamps used will be simplified for ease of explanation. Drawing 201 of FIG. 2 illustrates how to determine the send time of an RTP packet using information provided in an RTCP packet. As shown in the legend 202, the sampling rate is 8 KHz so that one sampling period is 0.125 ms. Dashed line 204 represents time and it increases from top to bottom. Points 214 and 216 represent different points in time. The RTCP 206 packet is sent at time 214 and includes a NTP timestamp and a corresponding RTP timestamp as shown in box 208. The RTCP 206 NTP timestamp (also referred to as the wall clock time)=3021157382.18 seconds (since Jan. 1, 1900). The corresponding RTP timestamp=15343. FIG. 2 also illustrates a RTP-N packet 210. Box 212 of FIG. 2 shows the RTP-N packet timestamp included in the RTP-N packet 210 and how to calculate the actual send time for the RTP-N packet from the RTP-N packet timestamp, the RTCP 206 NTP timestamp, the RTCP 206 RTP timestamp and the sampling period. The RTP-N packet 210 includes the RTP-N timestamp=15687. The actual send time is calculated as RTCP NTP timestamp/wall clock time in seconds+(RTP-N timestamp−RTCP RTP timestamp)*sampling period. The send time for the RTP-N packet 210=3021157382.18+(15687−15343)*0.000125 seconds. The terms "NTP time", "NTP timestamp", "wall clock time", "wall clock timestamp" and "RTCP packet timestamp value" are used interchangeably herein. Similarly the terms "RTP time", "RTP timestamp", and "RTP timestamp value" are also used interchangeably herein.

Transcoding refers to the functionality of changing the format of a media stream (e.g., an audio or video stream) encoded in a first format in accordance with a first codec to a second encoding format in accordance with a second codec. In some communication sessions having audio and video streams, transcoding is needed for audio, video, or both audio and video streams of the communication session and the transcoding may happen in different devices for the audio and the video. Devices that perform transcoding are called transcoders. A transcoder populates relevant fields of the RTP/RTCP packets according to the time those packets egress the transcoder. This causes the original sent time to be lost as shown in drawing 301 of FIG. 3.

In the drawing 301 of FIG. 3, the sending device 302 transmits an audio message 310 with a sent time=T0, e.g., an RTP packet with audio data content, and a video message 316 with a video sent time also equal to T0, e.g., an RTP packet with video data content. The audio packet is not transcoded so it bypasses the transcoder 304 and goes directly from the transcoder at step 308 to the receiver 306 at step 312. This results the audio message's sent time remaining T0. That is the audio message's sent time remains unchanged. The video message 316 however is sent from the sending device 302 at step 314 with a sent time of T0 to the transcoder 304 at step 318. The transcoder then transcodes the video message 316 and at step 320 transmits the transcoded video message 322 to the receiver 306 with a sent time of T0+X. For example, the transcoder populates relevant fields of RTP/RTCP packets according to the time those packets egress the transcoder 304. At step 324 the receiver 306 receives the transcoded video message 322 with the sent time T0+X. While the audio and video messages included the same sent times when transmitted by the sending device 302, they now have different sent times when received by the receiver 306 due to the transcoding of the transmitted video but not the transmitted audio message. The audio and video message sent times and therefore the messages themselves are no longer synchronized.

Furthermore, the sending device and transcoder are using their own wall clocks which makes any sent time related adjustment in the transcoder problematic. While wall clocks are expected to be calibrated by contacting a Network Time Protocol (NTP) server, an acceptable accuracy for synchronization especially for consumer devices, e.g., browsers running on PCs, smartphones, and tablets is not achieved.

In some communication sessions transrating is applied to change the data rate of a packet stream by changing the amount of data included in each packet. The use of transrating devices sometimes referred to as transraters during a communication session result in the same type of problem described above in connection with transcoders. In most cases, transcoders also perform transrating.

It should be appreciated that there is a need for methods and apparatus that can accurately synchronize data streams such as for example audio and video streams.

It should further be appreciated that there is a need for methods and apparatus that can minimize and/or eliminate synchronization problems introduced by intermediary transcoding and/or transrating devices which are used in a communication path between a sending and receiving device.

It should further be appreciated that there is a need for methods and apparatus that improve lip synching performance for data streams with one or more intermediary devices introducing delay to audio and/or video between the sending and receiving devices.

It should further be appreciated that there is a need for methods and apparatus to accurately generate network round trip time for data streams passing through one or more intermediary devices between the network sending and receiving devices.

SUMMARY

Various embodiments, in accordance with the present invention, are directed to methods and apparatus for synchronizing data streams such as for example RTP data streams carrying audio and video content.

For example, one embodiment of the method of the present invention include the steps of (i) receiving packets of a first RTP packet stream at a packet processing device, the received packets of the first RTP packet stream including first RTP timestamp values; (ii) receiving packets of a first RTCP packet stream that corresponds to the first RTP packet stream at the packet processing device, a first packet in said first RTCP packet stream including information correlating a first RTCP NTP packet timestamp value to a RTP timestamp value of said first RTP packet stream; (iii) generating, at the packet processing device, from received RTP packets of the first RTP packet stream, a second RTP packet stream including RTP packets which are different from the RTP packets included in the first RTP packet stream, said generating a second RTP packet stream including generating second RTP timestamp values; and (iv) generating at the packet processing device, a second RTCP packet stream from the received first RTCP packets, the second RTCP packet stream including a second RTCP packet including a second RTCP packet NTP timestamp value which is associated in the second RTCP packet with a RTP timestamp value of the second RTP packet stream, the second NTP timestamp value corresponding to content in the first and second RTP streams which is the same or content in said second RTP packet stream which was generated by transrating or transcoding content in said first RTP packet stream corresponding to the second RTCP packet NTP timestamp value.

In some embodiments of the method the second RTP packets differ from the first RTP packets with respect to at least one of packet payload content or included RTP timestamp values. In some embodiments of the method, the first RTP packet stream communicates content corresponding to a time period corresponding to a range of RTCP packet NTP timestamp values. In some embodiments, the timestamp values of the first and second RTP packet stream are different and the RTCP packet NTP timestamp values included in the first and second RTCP packet streams are the same but correspond to different RTP timestamp values. In some embodiments, the packet processing device is one of a transcoder device which recodes content, a transrating device which changes the data rate used to communicate content or a device which performs transcoding and transrating on content. In some embodiments, the individual packets in the second RTP packet stream include content corresponding to different amounts of time than individual packets in the first RTP packet stream and the step of generating a second RTCP packet stream includes generating new RTCP packet NTP timestamp values for inclusion in said RTCP packet stream based on the amount of time to which content in the second RTP packet stream correspond.

In some embodiments, the method further includes steps to determine round trip time at the packet processing device. In some of such embodiments, the method includes the further steps of storing, in memory at the packet processing device, a native NTP time at which a third RTCP packet of the second RTCP packet stream was transmitted from the packet processing device; storing, in memory at the packet processing device, the NTP timestamp value include in the third RTCP packet, said stored NTP timestamp value being associated with said native NTP time of the transmission of the third RTCP packet; receiving, at the packet processing device, a fourth RTCP packet containing a NTP timestamp value equal to the NTP timestamp value of the third RTCP packet; determining, at the packet processing device, the native NTP time at which the fourth RTCP packet was received at the packet processing device; and generating a round trip time based on the stored native NTP time at which the third RTCP packet was transmitted from the packet processing device and the native NTP time at which the fourth RTCP packet was received at the packet processing device.

In some embodiments of the method, the method further includes receiving at a multi-media device the second RTCP packet stream, the second RTP packet stream, and a third RTP packet stream, the third RTP packet stream being different than the first and said second RTP packet streams; and synchronizing the playback, at the multi-media device, multi-media content included in the second and the third RTP packet streams.

Some embodiments of the present invention are directed to apparatus. For example, a packet processing apparatus such as for example a transcoder or transrater including an I/O interface configured to: (i) receive packets of a first RTP packet stream including first RTP timestamp values, and (ii) receive packets of a first RTCP packet stream that corresponds to said first RTP packet stream, a first packet in said first RTCP packet stream including information correlating a first RTCP NTP packet timestamp value to a RTP timestamp value of said first RTP packet stream; a packet generation module configured to: (i) generate from the received RTP packets of said first RTP packet stream, a second RTP packet stream including RTP packets which are different from the RTP packets included in said first RTP packet stream, said second RTP packets including second RTP timestamp values generated by said packet generation module; and (ii) generate a second RTCP packet stream from the received first RTCP packets, said second RTCP packet stream including a second RTCP packet including a second RTCP packet NTP timestamp value which is associated in said second RTCP packet with a RTP timestamp value of said second RTP packet stream, the second RTCP packet NTP timestamp value corresponding to content in said first and second RTP streams which is the same or content in said second RTP packet stream which was generated by transrating or transcoding content in said first RTP packet stream corresponding to said second RTCP packet NTP timestamp value. In another aspect of the present invention, the second RTCP packet stream includes packets with NTP timestamp values derived from the NTP timestamp values of packets of the first RTCP packet stream.

While various exemplary embodiments and features have been described, numerous additional features and embodiments are described in the detailed description which follows.

DETAILED DESCRIPTION

Figure 1:
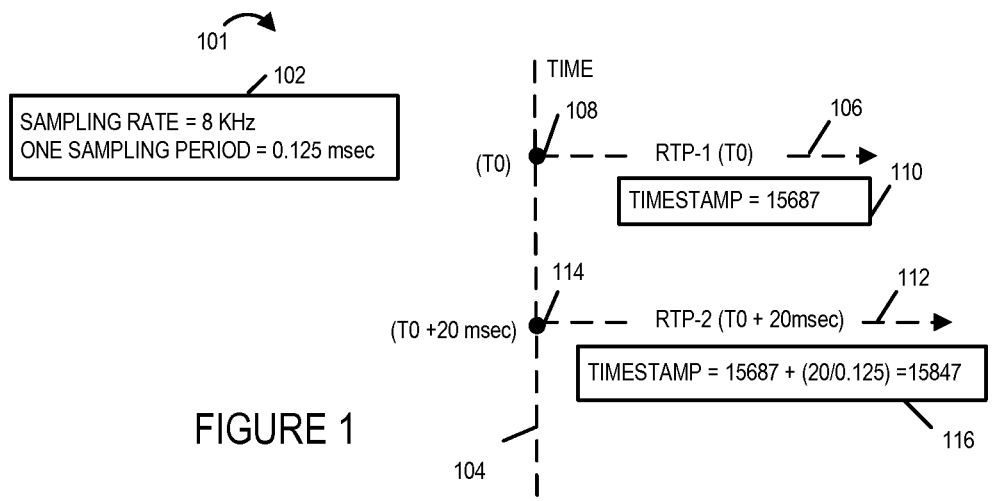
FIG. 1 illustrates an example of a timestamp at two instances in time for two RTP packets.
Figure 2:
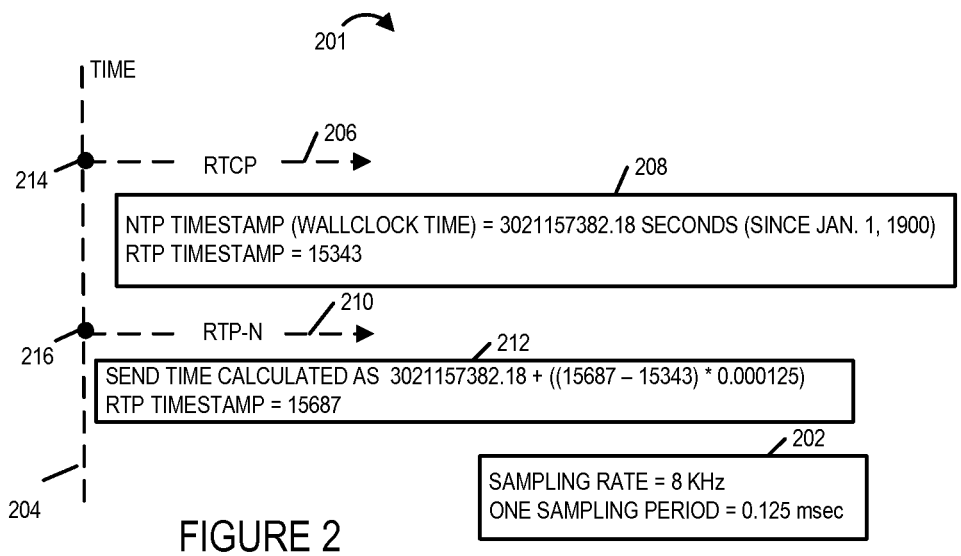
FIG. 2 illustrates how to determine the send time of a RTP packet using information provided in an RTCP packet.
Figure 3:
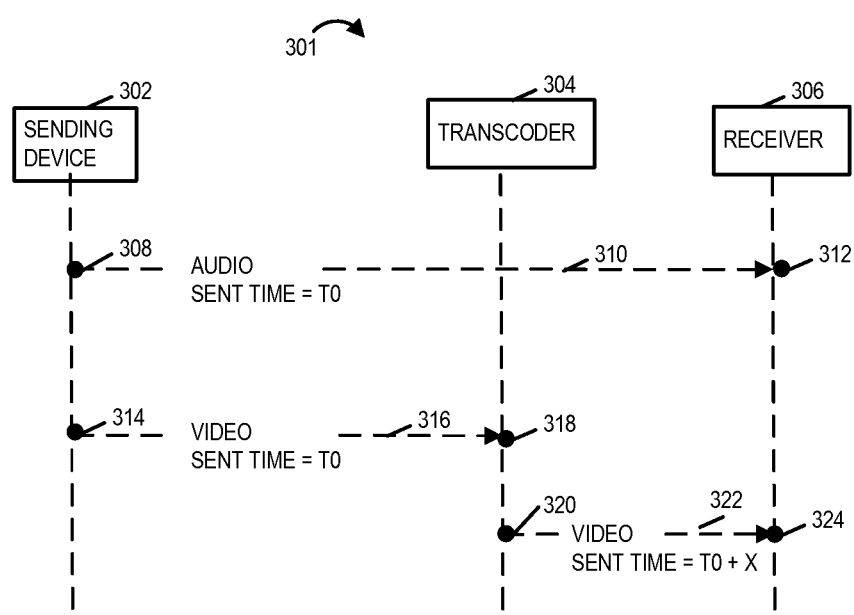
FIG. 3 illustrates an example of how the sending time and therein the synchronization between an audio and video message can be lost when using an intermediary device such as a transcoder.
Figure 4:
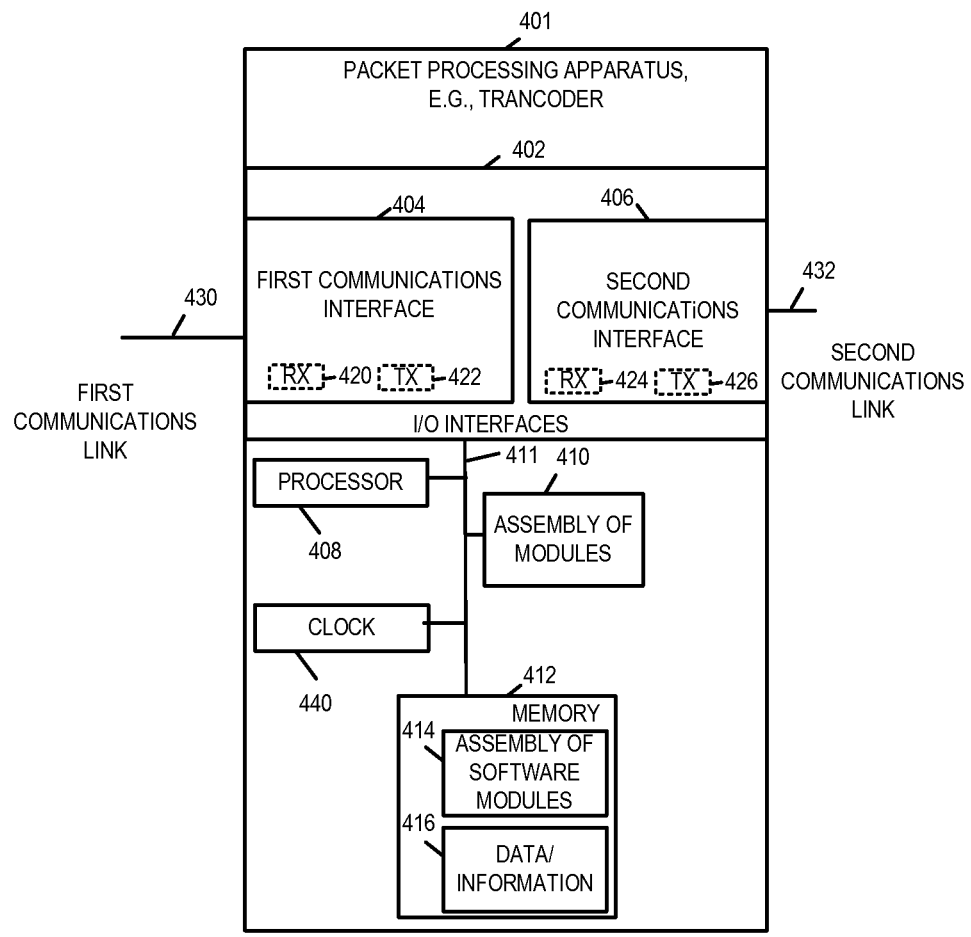
FIG. 4 illustrates an exemplary packet processing apparatus in accordance with an exemplary embodiment of the present invention.

FIG. 4 is a drawing of an exemplary packet processing apparatus in accordance with an exemplary embodiment of the present invention. Packet processing apparatus 401 may be implemented as a collection of separate devices or as a single apparatus or device. In some embodiments the packet processing apparatus may be implemented as a system. The packet processing apparatus 401 will also be referred to herein as packet processing device 401. Packet processing device 401 may be, and in some embodiments is, implemented as an integrated circuit such as a semiconductor chip.

Exemplary packet processing device 401 includes I/O interfaces 402, a processor 408, a clock 440, an assembly of modules 410, e.g., an assembly of circuits, and memory 412, coupled together via a bus 411 over which the various elements may interchange data and information. I/O interfaces 402 includes a plurality of interfaces including a first communications interface 404 and a second communications interface 406. In some embodiments, the first communications interface 404 includes a receiver 420 and a transmitter 422. In some embodiments, the second communications interface 406 includes a receiver 424 and a transmitter 426. Memory 412 includes an assembly of software modules 414 and data/information 416.

Exemplary first communications interface 404 couples packet processing device 401 to a first communications link 430, e.g., first network link, from which it receives packets, e.g., RTP and RTCP packets, to be processed. Exemplary second communications interface 406 couples the packet processing device 401 to a second communications link 432, e.g., second network link over which the packet processing device transmits packets that the packet processing device 401 has processed. In some embodiments, the packet processing device receives and processes packets from both the first and second communication links 430 and 432 and transmits processed packets over both the first and second communication links 430 and 432. In some embodiments, the packet processing device performs transcoding and/or transrating of the data content of incoming packets. In some embodiments, the packet processing device is a transcoder. In some embodiments, the packet processing device is a transrater.

Figure 8:
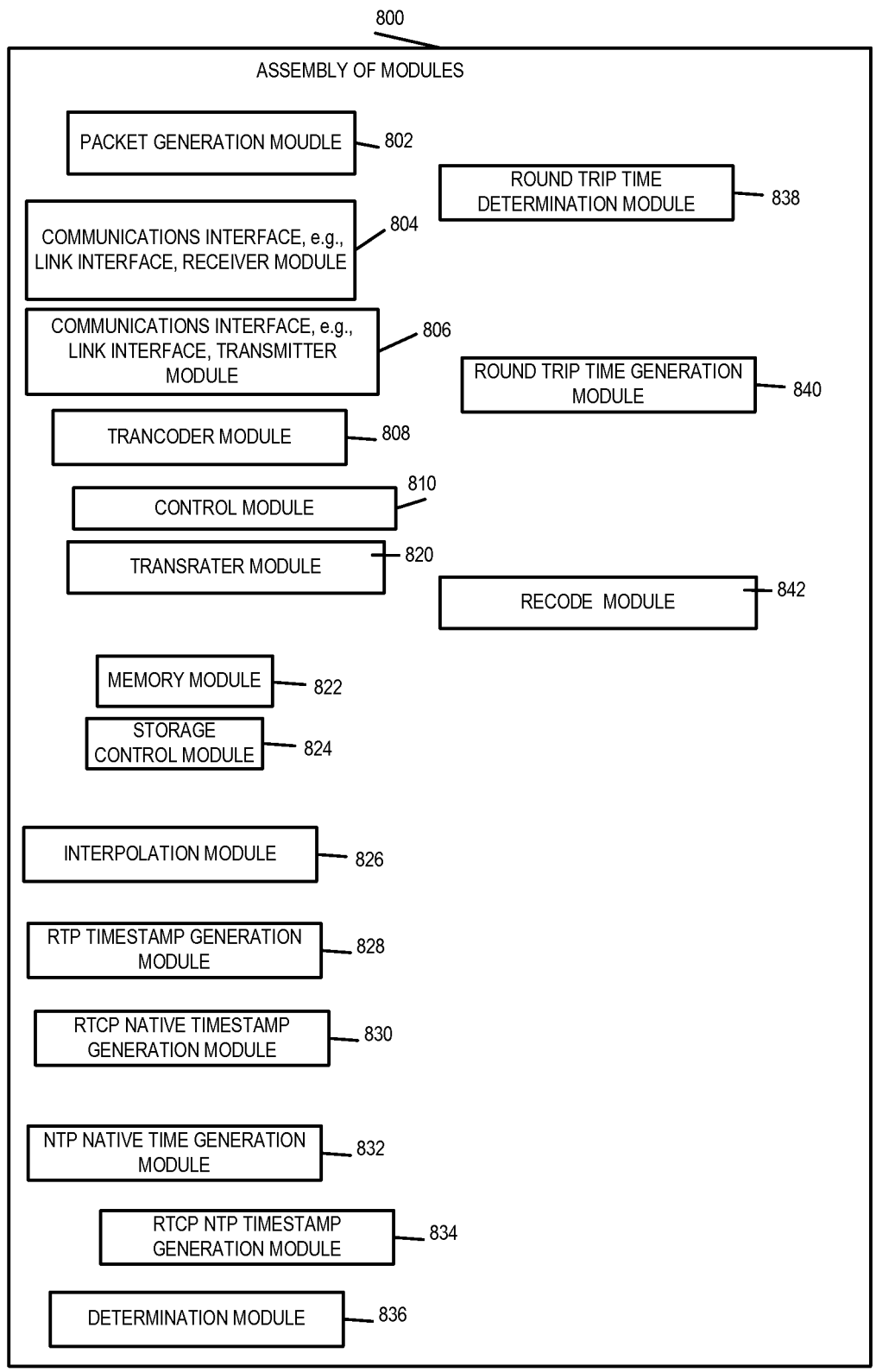
FIG. 8 illustrates an exemplary assembly of modules for use in a packet processing apparatus in accordance with one embodiment of the present invention.

In some embodiments, one or more modules of the assembly of modules 800 of FIG. 8 is used in the assembly of modules 410 and/or 414 of packet processing apparatus 400. The assembly of modules 800 of FIG. 8 may be, and in some embodiments is, used as the assembly of modules 410 and/or 414 in some embodiments of the packet processing apparatus 401.

Figure 9:
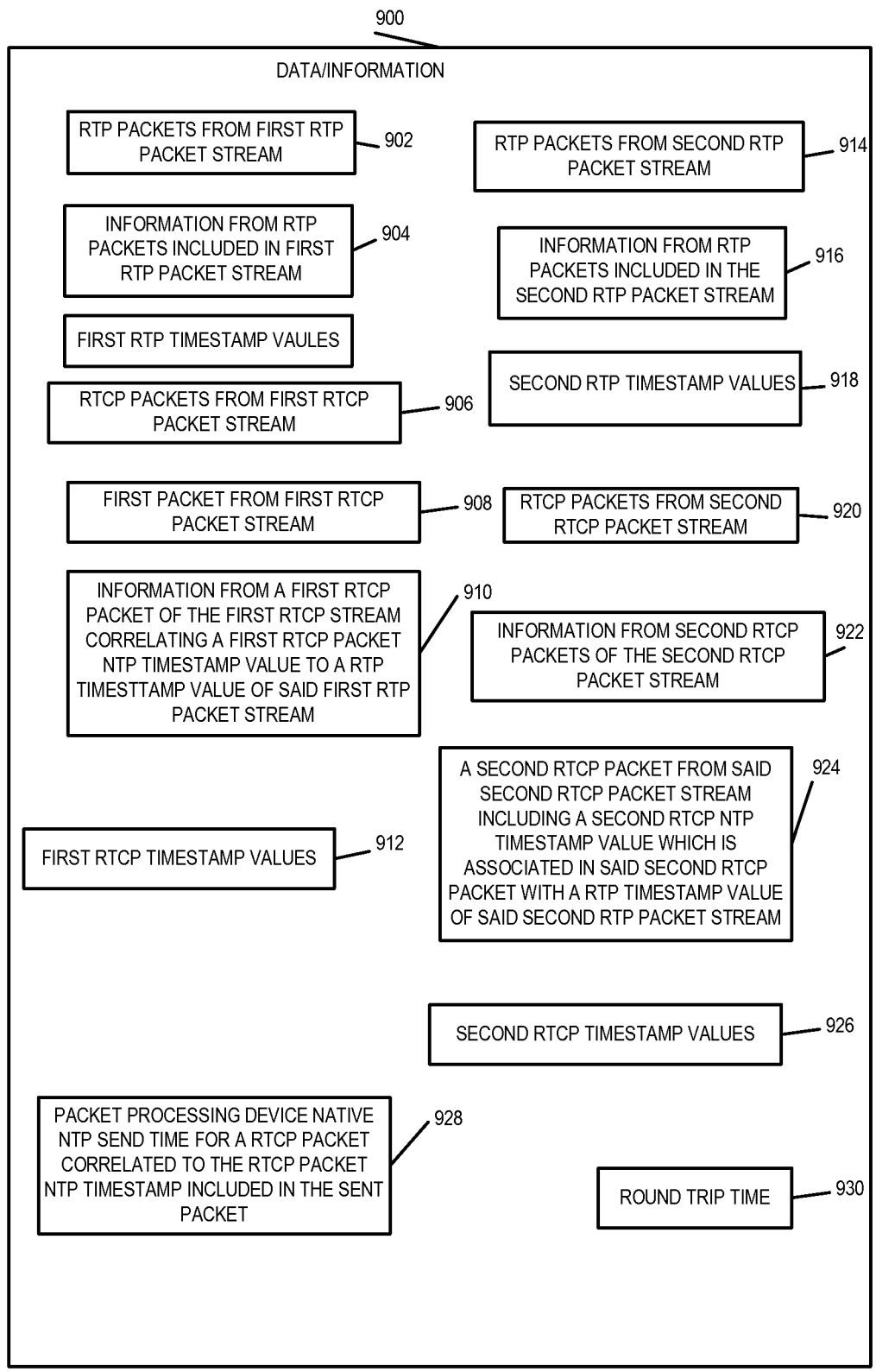
FIG. 9 illustrates exemplary data/information that may be stored in memory of a packet processing device in accordance with one embodiment of the present invention.

Data/information 900 illustrates an example of the items that may be, and in some embodiments are, stored in memory 412 data/information section 416 of packet processing apparatus 401 in accordance with one embodiment of the present invention. In some embodiments, one or more items of the data/information 900 of FIG. 9 are stored in the data/information portion 416 of memory 412 of the packet processing apparatus 401 of FIG. 4.

Figure 15:
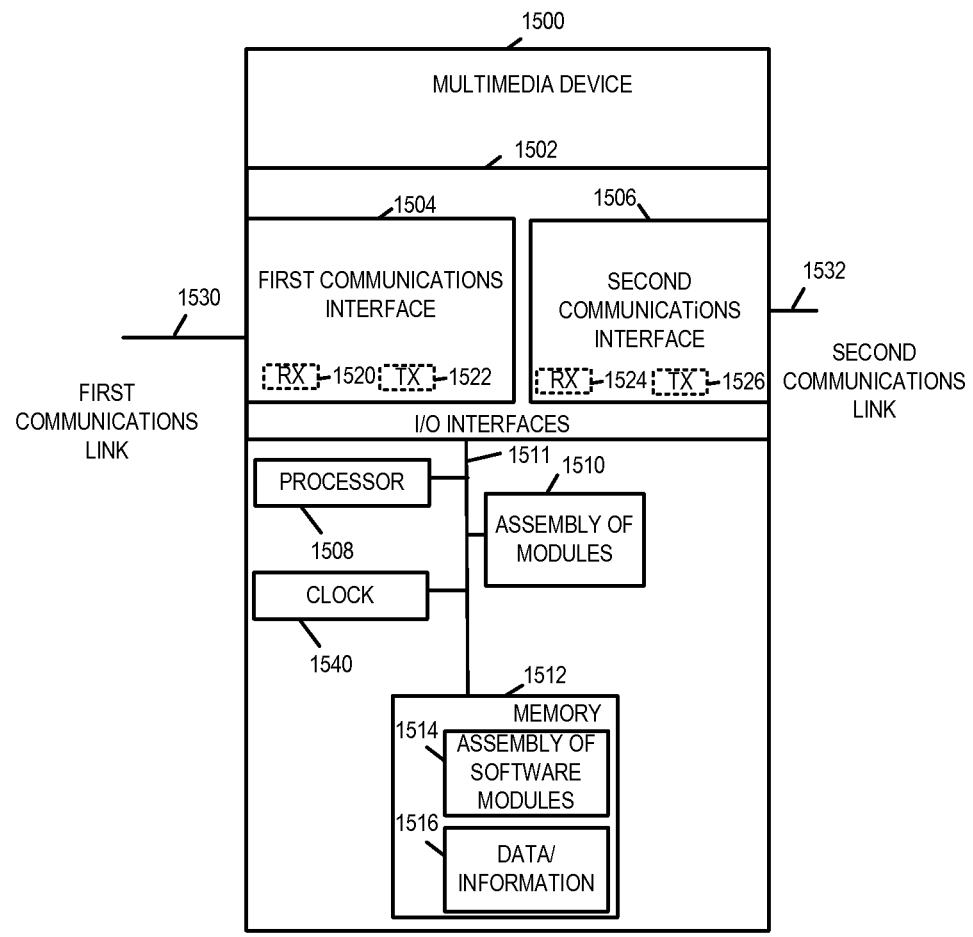
FIG. 15 illustrates an exemplary multi-media device in accordance with an embodiment of the present invention.

FIG. 15 is a drawing of an exemplary multi-media device 1500. The Multi-media device 1500 may be implemented as a collection of separate devices or as a single apparatus or device. Multi-media device 1500 may be, and in some embodiments is, implemented as an integrated circuit such as a semiconductor chip.

Exemplary multi-media device 1500 includes I/O interfaces 1502, a processor 1508, a clock 1540, an assembly of modules 1510, e.g., an assembly of circuits, and memory 1512, coupled together via a bus 1511 over which the various elements may interchange data and information. I/O interfaces 1502 includes a plurality of interfaces including a first communications interface 1504 and a second communications interface 1506. In some embodiments, the first communications interface 1504 includes a receiver 1520 and a transmitter 1522. In some embodiments, the second communications interface 1506 includes a receiver 1524 and a transmitter 1526. Memory 1512 includes an assembly of software modules 1514 and data/information 1516.

Exemplary first communications interface 1504 couples multi-media device 1500 to a first communications link 1532, e.g., first network link, from which it receives packets, e.g., RTP and RTCP packets, to be processed or over which it transmits packets, e.g., RTP and RTCP packets which it generated. Exemplary second communications interface 1506 couples the multi-media device 1500 to a second communications link 1532, e.g., second network link over which the packet processing device transmits packets that the multi-media device 1500 has processed and/or generated or over which it receives packets to process. In some embodiments, the multi-media device receives and processes packets from both the first and second communication links 1530 and 1532 and transmits processed packets over both the first and second communication links 1530 and 1532. In some embodiments of the present invention, the multi-media device includes modules, either software or hardware or a combination of software and hardware modules, for playing back content, e.g., multi-media content, received in RTP data streams. In some embodiments of the present invention, the multi-media device includes modules, either software or hardware or a combination of software and hardware modules, for generating RTP packet data streams including multi-media content, e.g., audio and/or video content, and for generating associated RTCP packet streams. In some embodiments, the multi-media device 1500 includes modules for both generating and playing back RTP data streams such as for example, RTP packet streams including multi-media content and associated RTCP packet streams.

In an embodiment of the present invention, synchronization of RTP data streams is achieved by recording the original sending device's wall clock time information in an associated RTCP stream for all related RTP media streams and preserving that wall clock information even through intermediary packet processing device such as for example transcoders and/or transraters. Meanwhile, a given sending device's wall clock timestamp is kept associated with the same point in the data stream, e.g., in an audio stream, through transcoders even though transcoders may change the RTP timestamps, and may split or merge N incoming RTP messages to M outgoing RTP messages. At the ultimate destination device, or at one or more devices implementing the present invention on the media path before the ultimate destination device, the common sending device wall clock associated with all the related media streams is used to "true up" any differential delay that has accumulated between the related RTP media streams therein synchronizing the related RTP media streams. The calculated original send time for each stream is used by the playout logic of the destination device to match audio/video packets/packet ranges for simultaneous playout.

In this exemplary embodiment of the present invention, an intermediate transcoder and/or transrater relays the wall clock time effectively unchanged in RTCP messages but the transcoder/transrater generates its own RTP timestamps which are placed into outgoing RTP and RTCP messages also referred to as packets. In some cases, the transcoder/transrater generated RTP timestamps are the same as the ones it received but in the general case transcoder/transrater generated RTP timestamps are different.

In the exemplary embodiment a packet processing device such as a transcoder or transrater includes a receiving RTP packets step, a processing RTP packets step (e.g., transcoding RTP packet data content, a generating new RTP packets step with new RTP timestamp values, and a transmission step in which the newly generated RTP packets are sent by packet processing device to their next destination. In the receiving step, the packet processing device, e.g., a transcoder receives a series of RTP packets with RTP timestamp values. For example, RTP packet 1 with timestamp value R1, RTP packet 2 with timestamp value R2, RTP packet 3 with timestamp value R3, ..., RTP packet N with timestamp value RN.

Operation proceeds from the packet receiving step to the packet processing step. In the packet processing step, the packet processing device, e.g., packet processing device 401, applies existing/standard jitter buffer logic/error concealment and transcodes the series of received RTP packets. Operation proceeds from the packet processing step to the generating new RTP packets step.

In the generating new RTP packets step, a series of new RTP packets are generated based on the processed RTP packets. In generating each of the new RTP packets, the packet processing device sets the RTP timestamp value of each new RTP packet to the current local RTP time stamp value. For example, new RTP packet 1 is set to have a timestamp value equal to S1, new RTP packet 2 is set to have a timestamp value equal to S2, new RTP packet 3 is set to have a timestamp value of S3, ..., new RTP packet N is set to have a timestamp value of SN where S1, S2, S3, ..., SN are the current local RTP time stamp values corresponding to when each of the new RTP packets will egress the packet processing device. Operation proceeds from the new RTP packet generation step to the new RTP packet transmission step.

In the new RTP packet transmission step, the packet processing device sends each newly generated RTP packet of the new RTP packet stream to its next destination.

In the exemplary embodiment, the packet processing device, e.g., packet processing device 401 which may be, and in some embodiments is, a transcoder and/or transrater, receives and processes the series of RTCP packets corresponding to the RTP packets it received and processed. The packet processing device also generates and transmits a new series of RTCP packets to the same destination as it sent the newly generated RTP packets.

In one embodiment if the packet processing device, e.g., transcoder/transrater, is going to egress an RTCP message immediately, the packet processing device, e.g., transcoder/transrater, receives the RTCP message with the sender wall clock timestamp value T0 (i.e., RTCP packet NTP timestamp value=T0) and RTCP RTP timestamp value=R. The packet processing device, e.g., transcoder/transrater, generates a new RTCP message based at least in part on the received RTCP message. In the newly generated RTCP message, the packet processing device, e.g., transcoder/transrater, populates the wall clock timestamp of the generated RTCP message with the value T0 (i.e., RTCP packet NTP timestamp value=T0) and populates the RTP timestamp field of the generated RTCP message with the RTP timestamp S, which is the RTP timestamp to use at this moment and which corresponds to the same point in the media stream, e.g., audio stream, as the received RTP message timestamp R. The packet processing device, e.g., transcoder/transrater, then egresses the generated RTCP message by transmitting or sending the generated RTCP message on to the next destination on the media path.

If however the packet processing device, e.g., transcoder/transrater, is going to egress the received RTCP message at a different time then the following method, may, and in some embodiments is, employed. The packet processing device, e.g., transcoder/transceiver, receives the RTCP message with the sender wall clock timestamp T0 (i.e., RTCP packet NPT timestamp=T0) and RTP timestamp R. The packet processing device, e.g., transcoder/transceiver, stores the time when the RTCP message was received in memory. The packet processing device, e.g., transcoder/transrater, generates a new RTCP message based on the received RTCP message and the stored reception time. When it is time to egress the newly generated RTCP message, the packet processing device, e.g., transcoder/transrater, calculates the difference or delta between the current time and the RTCP receipt time which had been stored in memory. The packet processing device, e.g., transcoder/transrater, adds the calculated delta to the received RTCP wall clock timestamp (RTCP packet NTP timestamp) and uses it as the wall clock time for the RTCP message to be egressed. The packet processing device, e.g., transcoder/transrater, populates the generated RTCP message's RTP timestamp field with the RTP timestamp value to be used at that moment. This RTP timestamp points to the same point in the media stream, e.g., audio stream, as the RTP timestamp of the received RTCP message+delta.

If a packet processing device, e.g., transcoder/transrater, needs to send RTCP messages, as discussed above, at a different pace than it is receiving the RTCP messages, the packet processing device, e.g., transcoder/transrater, can use interpolation methods to adjust the wall clock timestamps in the sent RTCP messages while still maintaining the correct reference to the media stream. That is if an RTCP message must be sent 3.31 seconds after one was received, the wall clock time in the sent RTCP message can be adjusted by adding 3.31 seconds to the RTCP packet NTP timestamp as long as the RTP sequence number is also adjusted to bind the new wall clock timestamp to a point 3.31 seconds later in the media stream.

Figure 5:
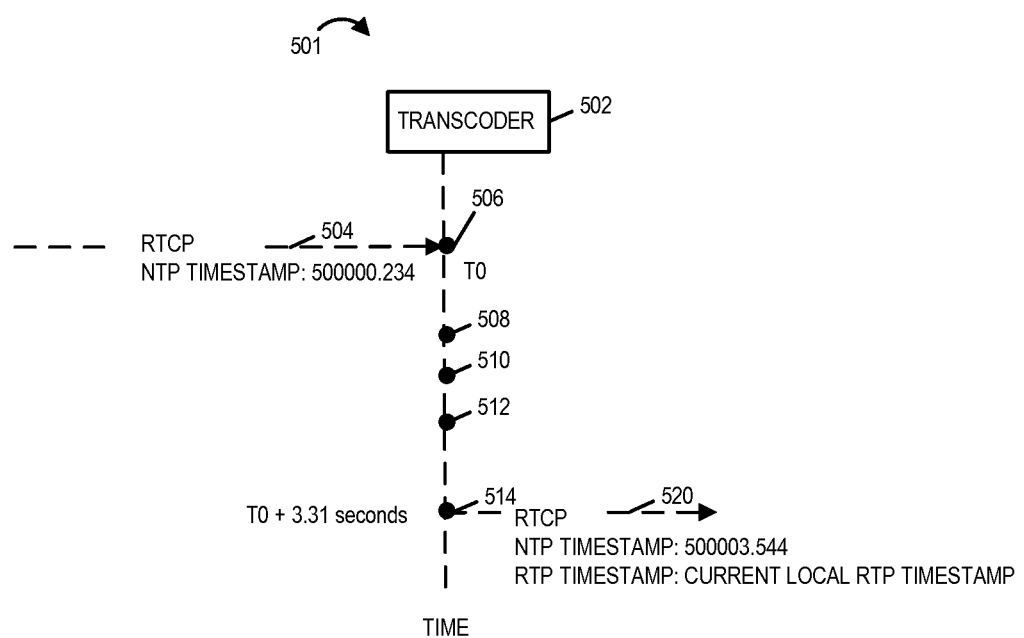
FIG. 5 illustrates an exemplary method of adjusting the RTCP packet NTP timestamp at a transcoder in accordance with one embodiment of the present invention.

Method 501 of FIG. 5 illustrates an exemplary method of adjusting the RTCP packet NTP timestamp at a transcoder 502 in accordance with one embodiment of the present invention. In this example transcoder 502 is implemented in accordance with the exemplary packet processing device 401 of FIG. 4. The example will now be explained using the elements of the packet processing device 401 illustrated in FIG. 4. The method begins at step 506 when the RTCP packet 504 is received by the packet processing device 401 receiver 420 of the first communications interface on first communications link 430. The RTCP packet 504 contains an RTCP packet NTP timestamp equal to 50000.234. The RTCP packet 504 is received at time T0. Processing proceeds from step 506 to step 508. In step 508, the packet processing device 401 processes the packet including storing in the data/information portion 416 of memory 412 the time T0 that RTCP packet 504 was received by the packet processing device. Operation proceeds from step 508 to step 510.

In step 510, the packet processing device determines using the stored received time T0 of the RTCP packet 504 that it will generate a new RTCP packet 520 based on the received RTCP packet 504 but will need to egress the newly generated RTCP packet 520 3.31 seconds after the RTCP packet 504 was received. Operation proceeds from step 510 to step 512.

In step 512, the packet processing device 401 generates RTCP packet 520 based on the received RTCP packet 504 and the determined amount of time that will elapse between receipt of the RTCP packet 504 and the egress of the RTCP packet 520. The packet processing device 401 includes in the RTCP packet 520 an NTP timestamp value equal to 500003.544 and a RTP timestamp value equal to the current local RTP timestamp value. The NTP timestamp value being generated by adding the determined elapsed time from receipt of the RTCP packet 504 to the egress of the RTCP packet 520 which is 3.31 seconds to the NTP timestamp of 500000.234 of the received RTCP packet 504. Operation proceeds from step 512 to step 514.

In step 514, the packet processing device 401 transmits the generated RTCP packet 520 to its next destination via second communications interface 406 transmitter 426 over second communications link 432.

Figure 6:
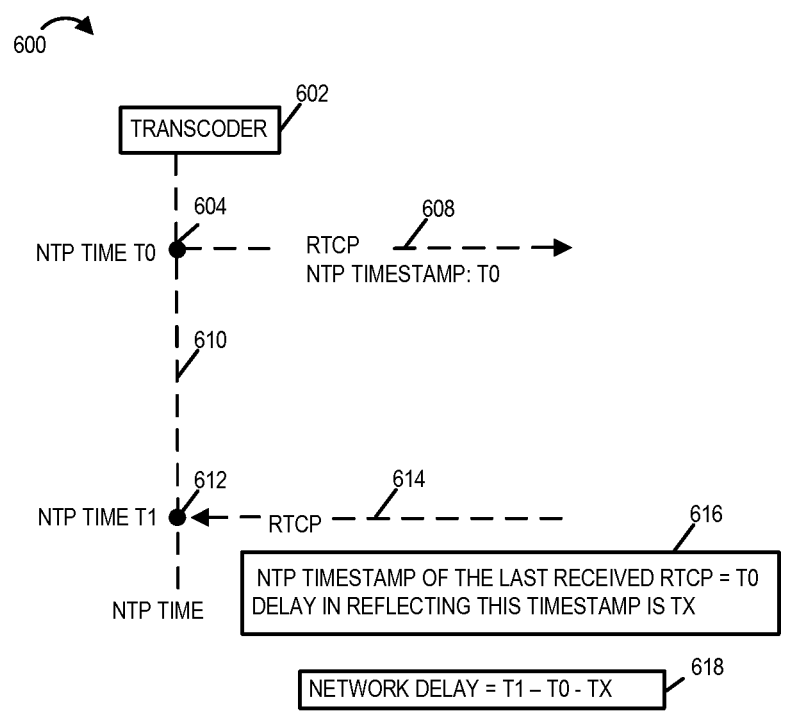
FIG. 6 illustrates how to calculate round trip time for standard deployments using native NTP timestamps for RTCP packets.

Round trip time is the length of time it takes from when a signal is sent to when an acknowledgement of the signal is received. When using non-native NTP timestamps for RTCP packets generated by an intermediary packet processing device such as for example a transcoder, the round trip time (RTT) calculation will be affected. Method 600 of FIG. 6 illustrates how to calculate RTT for standard deployments using native NTP timestamps for RTCP packets. In FIG. 6, dashed line 6 shows a NTP time line native to the transcoder 602. In the example, the method starts at step 604. In step 604, the packet processing device in this example the transcoder 602 transmits a RTCP packet 608 with a RTCP packet NTP timestamp set equal to time T0 which is the native NTP time of the transcoder coder 602 at the time the RTCP packet 608 is transmitted. Operation proceeds from step 604 to step 612.

In step 612, the transcoder 602 at its native NTP time T1, receives a RTCP packet 614 which includes an NTP timestamp of the last received RTCP packet having a value set to T0. Box 616 shows the NTP timestamp of the last received RTCP included in the RTCP packet 614 and the destination device's delay in reflecting this timestamp. The delay in reflecting this timestamp is TX. Operation proceeds to step 618.

In step 618, the transcoder 602 determines the round trip time, i.e., the network delay, as NTP Time T1 (native NTP time RTCP packet 614 received)−T0 (native NTP time RTCP packet 608 transmitted)−TX (the destination device's delay in reflecting the timestamp)

When the received RTCP packet NTP time is used by the packet processing device, e.g., the transcoder, for RTCP packets it generates based on the received RTCP packets instead of the native NTP time, the method 600 will not provide an accurate round trip time because the non-native NTP time was included in the transmitted RTCP packet.

Figure 7:
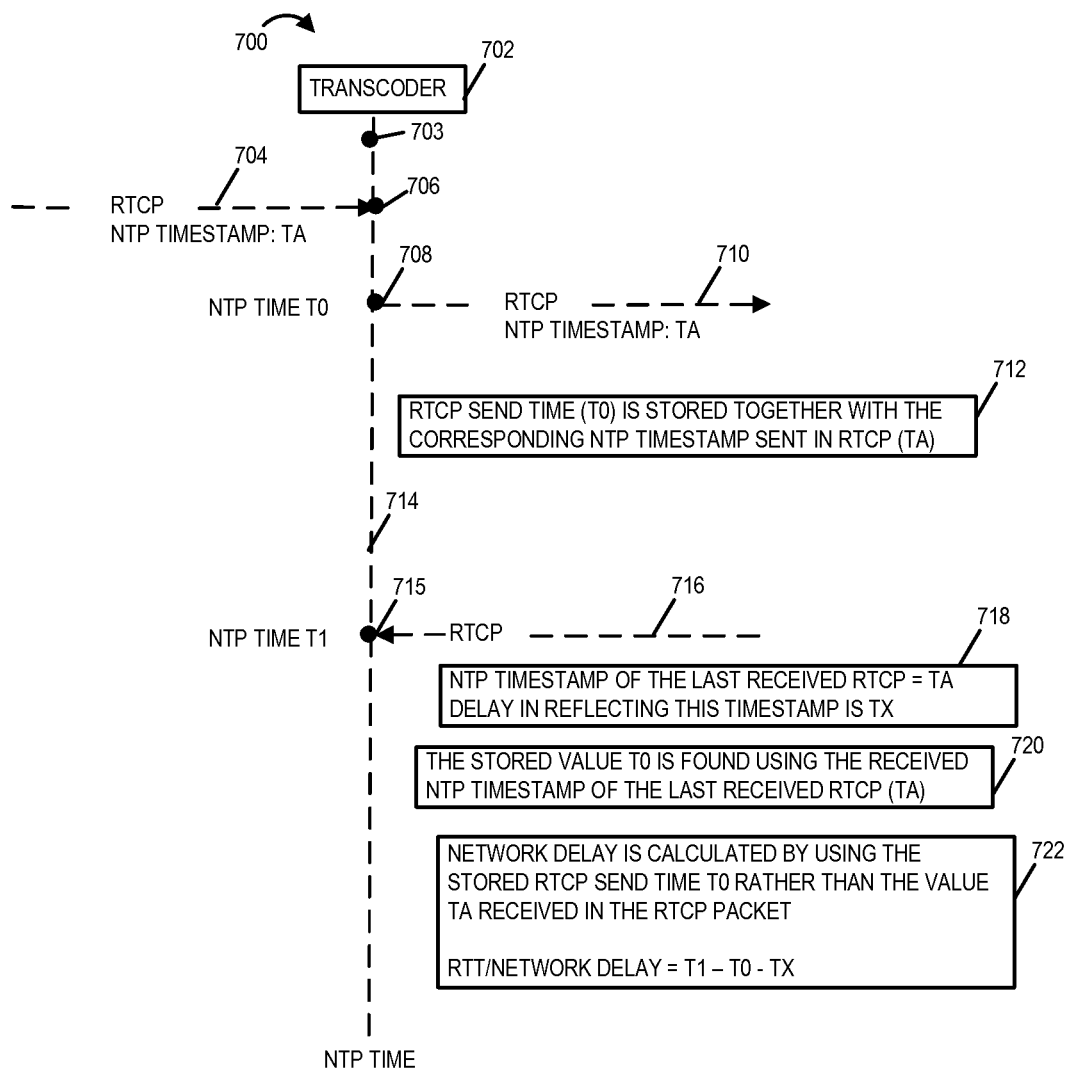
FIG. 7 illustrates an exemplary method to calculate the round trip time when the packet processing device, e.g., transcoder, uses the non-native RTCP packet NTP time in accordance with an exemplary embodiment of the present invention.

The method 700 of FIG. 7 illustrates an exemplary method to calculate the round trip time when the packet processing device, e.g., transcoder, uses the non-native RTCP packet NTP time in accordance with an exemplary embodiment of the present invention.

The method 700 is performed by transcoder 702 which may be, and in some embodiments is, implemented in accordance with packet processing device 401. Dashed line 714 of FIG. 7 illustrates the native NTP time for the transcoder 602. The method 700 starts at start step 703 from which operation proceeds to step 706.

In step 706, RTCP packet 704 including a RTCP packet NTP timestamp equal to TA is received by the transcoder 702. Operation proceeds from step 706 to step 708.

In step 708, the transcoder 702 transmits at native NTP time T0 a RTCP packet 710 generated from information contained in the received RTCP packet 704. The RTCP packet 710 includes a RTCP packet NTP timestamp equal to TA, the RTCP packet 704 NTP timestamp value. Operation proceeds from step 708 to step 712.

In step 712, the transcoder 702 stores in memory the native NPT time T0 that the RTCP packet 710 was sent together with the corresponding NTP timestamp value sent in the RTCP packet 710 which is NTP timestamp value TA. Operation proceeds to step 715.

In step 715, the transcoder 702 receives the RTCP packet 716 at native NTP time T1. The RTCP packet 716 which includes the NTP timestamp of the last received RTCP packet with a value of TA as shown in box 718. Box 718 also shows that the delay in reflecting this timestamp by the destination device is TX. Operation proceeds from step 715 to step 720.

In step 720, the transcoder 702 retrieves from memory the stored NTP time value of T0 using the NTP timestamp value TA received in the RTCP packet 716. Operation proceeds from step 720 to step 722.

In step 722, the round trip time also referred to as the network delay is calculated by the transcoder 702 by using the stored RTCP NTP send time T0 retrieved from memory rather than the NTP timestamp TA received in the RTCP packet 716. The transcoder generates the round trip time/network delay in accordance with the following equation: RTT=T1−T0−TX. The round trip time may, and in some embodiments, is stored in memory for use in other procedures or to maintain statics on the network delay for later use.

In some embodiments of the present invention the method includes receiving first RTP and first RTCP packet streams, generating a second RTP stream and second RTCP stream therefrom with the RTP stream including new RTP packets and with the RTCP stream including RTCP NTP timestamps correlating the new RTP timestamps to the same time interval as the RTCP NTP time stamps of the first RTCP stream, each RTCP NTP timestamp corresponding to a point in time. The second RTCP NTP timestamps can be the same values as the first RTCP NTP timestamps or interpolated values falling between the original RTCP NTP timestamps depending on whether or not the second RTP packets communicate content corresponding to the same amount of time as the first RTP packets which may not be the case if transrating is applied to change the data rate or transcoding is applied resulting potentially in different amounts of data per packet and possibly each packet corresponding to a different amount of time than the first RTP packets.

Figures 10, 10A, 10B, 10C:
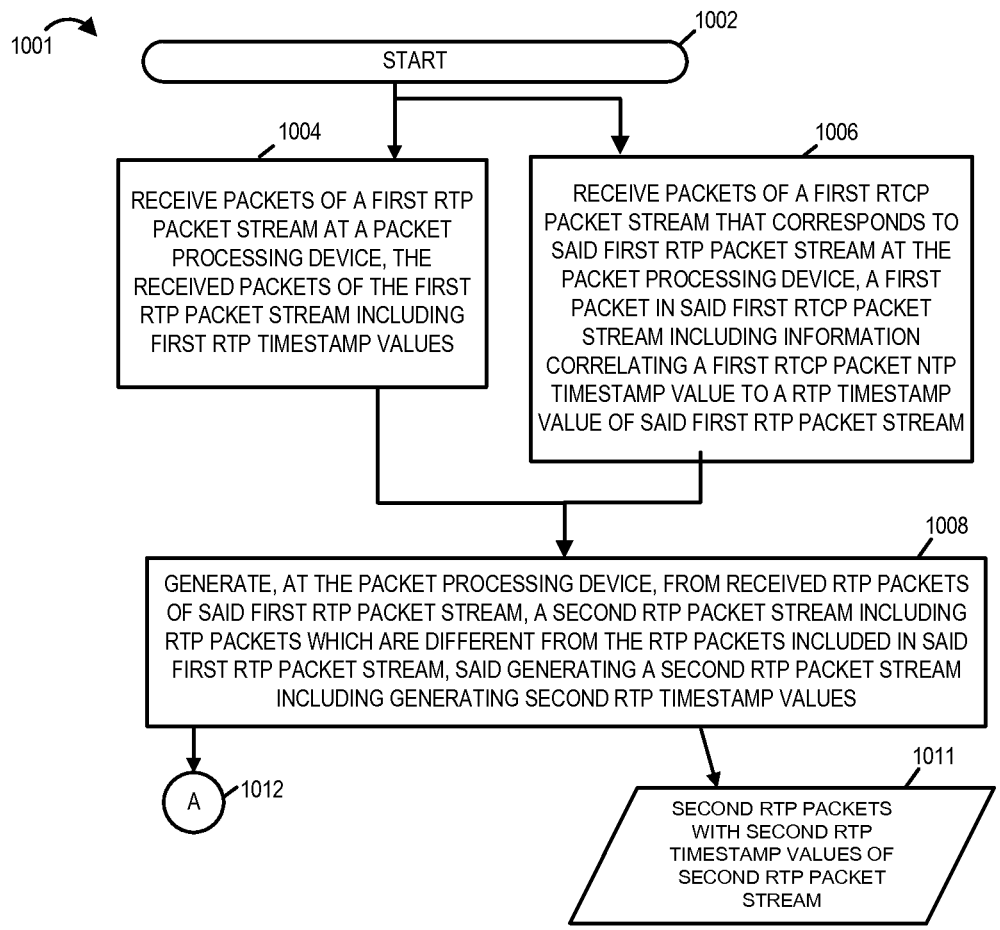
FIG. 10 illustrates a method in accordance with one embodiment of the present invention and is shown as including three parts a first part FIG. 10A, a second part FIG. 10B and a third part FIG. 10C.
FIG. 10A is a first part of a flowchart of an exemplary method in accordance with one embodiment of the present invention.
FIG. 10B is a second part of a flowchart of an exemplary method in accordance with one embodiment of the present invention
FIG. 10C is a third part of a flowchart of an of an exemplary method in accordance with one embodiment of the present invention.
Figure 10C:
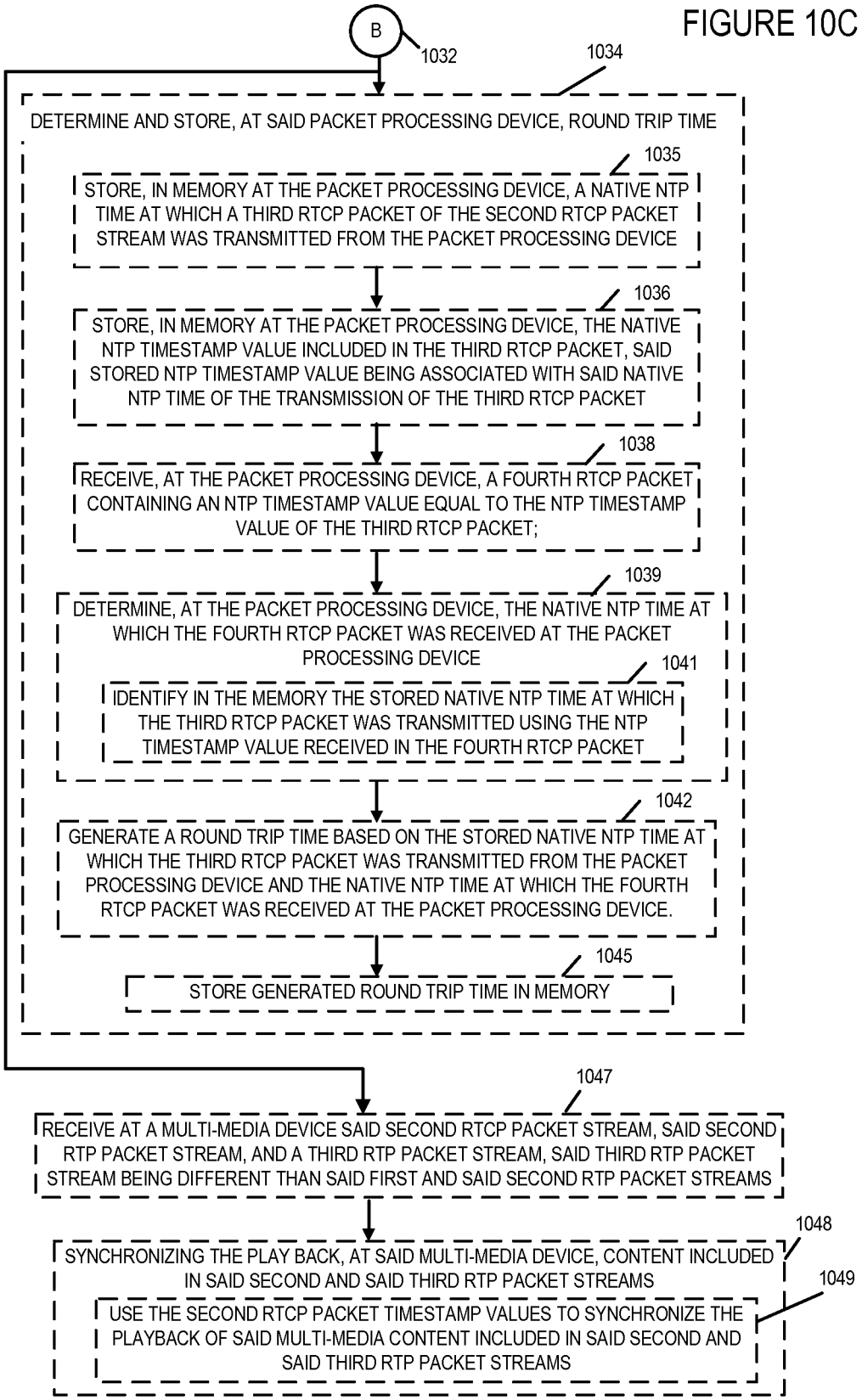

FIG. 10 consists of FIGS. 10A, 10B and 10C and illustrates a method 1001 for synchronizing RTP packets streams. The method 1001 may be, and in some embodiments is, performed by packet processing device 401. The exemplary method 1001 will be explained using the packet processing device 401. The method is intended to cover the concept of receiving first RTP and first RTCP packet streams, generating a second RTP stream and second RTCP stream therefrom with the RTP stream including new RTP packets and with the RTCP stream including RTCP time stamps correlating the new RTP time stamps to the same time interval as the RTCP time stamps of the first RTCP stream, each RTCP time stamp corresponding to a point in time–the second RTCP time stamps can be the same values as the first RTCP time stamps or interpolated values falling between the original RTCP time stamps depending on whether or not the second RTP packets communicate content corresponding to the same amount of time as the first RTP packets which may not be the case if transrating is applied to change the data rate or transcoding is applied resulting potentially in different amounts of data per packet and possibly each packet corresponding to a different amount of time than the first RTP packets.

The method 1001 commences at start step 1002 shown on FIG. 10A. Operation proceeds from start step 1002 to steps 1004 and 1006 in parallel. While these steps are shown as occurring in parallel they may also be performed sequentially wherein the order in which the steps are performed is not important.

In step 1004, packets of a first RTP packet stream are received at the packet processing device 401. The received RTP packets of the first RTP packet stream include first RTP timestamp values.

In step 1006, packets of a first RTCP packet stream that corresponds to the first RTP packet stream are received at the packet processing device 401. A first packet in said first RTCP packet stream includes information correlating a first RTCP NTP packet timestamp value to a RTP timestamp value of said first RTP packet stream.

Operation proceeds from step 1004 and 1006 to step 1008. In step 1008, a second RTP packet stream is generated, at the packet processing device 401, from the received RTP packets of said first RTP packet stream. The second RTP packet stream includes RTP packets which are different from the RTP packets included in said first RTP packet stream. The generation of the second RTP packet stream includes generating second RTP time stamp values for the packets of the second RTP packet stream. The generated second RTP packets 1011 include second RTP time stamp values of the second RTP packet stream.

Operation proceeds from step 1008 shown on FIG. 10A to step 1014 shown on FIG. 10B via connection node A 1012. In step 1014, a second RTCP packet stream 1031 is generated at the packet processing device 401. The second RTCP packet stream is generated from the received first RTCP packets of the first RTCP stream. The second RTCP packet stream includes a second RTCP packet NTP timestamp value which is associated in said second RTCP packet with a RTP timestamp value of said second RTP packet stream. The second RTCP packet NTP timestamp value corresponds to content in said first and second RTP streams which is the same or content in said second RTP packet stream which was generated by transrating or transcoding content in said first RTP packet stream corresponding to said second RTCP packet NTP timestamp value.

In some embodiments, step 1014 includes one or more of the optional sub-steps 1016, 1018, 1021, 1022, 1024, 1026, and 1028.

In sub-step 1016, the generation of the second RTCP packet stream includes the use of at least some of the first RTCP packet NTP timestamp values received in said first RTCP packet stream as second RCTP packet NTP timestamp values in said second RTCP packet stream.

In sub-step 1016, during the generation of the second RTCP packet stream one of the RTCP packet NTP timestamp values from the first RTCP packet stream is included in the second RTCP packet and a new RTP timestamp value is included in the second RTCP packet, said new RTP timestamp value corresponding to a packet in the second RTP packet stream communicating data generated from a RTP packet of the first RTP packet stream which included a RTP timestamp value which is different from said new RTP timestamp value but which communicated content corresponding to said one of the RTCP timestamp values. In some of such embodiments, the individual packets in said RTP stream include content corresponding to the same length of time as individual packets in said first RTP stream.

In some embodiments, wherein the individual packets in said second RTP packet stream include content corresponding to different amounts of time then individual packets in said first RTP packet stream, optional sub-step 1021 is performed. In sub-step 1021, the generation of the second RTCP packet stream includes generating new RTCP packet NTP timestamp values for inclusion in said second RTCP packet stream based on the amount of time to which content in the second RTP packet stream correspond. In some embodiments, the sub-step 1021 includes sub-step 1022. In sub-step 1022, said second RTCP packet NTP timestamp values generated for inclusion in said second RTCP packet stream are generated based on the content included in said second RTP packets with said second RTCP packet NTP timestamp values being generated such that a RTCP packet NTP timestamp value corresponds to the same content in either the first or second RTP content streams.

In sub-step 1024, at least one of the RTCP packet NTP timestamp values of the second RTCP stream is generated using interpolation.

In sub-step 1026, a RTP timestamp value to be included in a RTCP packet of the second RTCP packet stream is generated using interpolation.

In sub-step 1018, a RTCP packet NTP timestamp value to be included in a RTCP packet of the second RTCP packet stream is generated using interpolation.

In some embodiments, the optional steps 1047 and 1048 are performed. In such embodiments, operation proceeds from step 1014 to step 1047 shown on FIG. 10C via connection node B 1032. In step 1047, a multi-media device, such as for example multi-media device 1500 shown in FIG. 15, receives said second RTCP packet stream, said second RTP packet stream, and a third RTP packet stream, said third RTP packet stream being different than said first and said second RTP packet streams. The second RTCP packets stream and second RTP packet stream having been transmitted from said packet processing device. Operation proceeds from step 1047 to step 1048.

In step 1048, the multi-media device synchronizes the playback of the multi-media content, e.g., audio and video content, included in said second and said third RTP streams. In some embodiments, the step 1048 includes an optional sub-step 1049. In sub-step 1049, the synchronizing of the playback of the multi-media content includes using the second RTCP packet timestamp values to synchronize the playback of the multi-media content included in said second and said third RTP packet stream. The third RTP packet stream including timestamps being synchronized to the wallclock used to generate the first RTCP packet NTP timestamp values.

In some embodiments of the exemplary method 1001, the optional steps 1034 and its sub-steps 1035 1036, 1038, 1039, 1042 and 1045 are performed. These steps are typically performed in embodiments in which the round trip time or network delay is determined at packet processing device In some embodiments in which the round trip time is to be determined by the packet processing device, operation proceeds from step 1014 to optional step 1034 on FIG. 10C via connection node B 1032. In step 1034, the packet processing device determines and stores the round trip time. Optionally sub-steps 1035 1036, 1038, 1039, 1042 and 1045 of step 1034 may be, and in some embodiments are, performed to determine and store the round trip time at the packet processing device.

In step 1035, a native NTP time at which a third RTCP packet of the second RTCP packet stream was transmitted from the packet processing device is stored in memory. The native NTP time being the wallclock time of the packet processing device. Operation proceeds from step 1035 to optional step 1036.

In step 1036, the NTP timestamp value included in the third RTCP packet is stored in memory at the packet processing device. The stored NTP timestamp value being associated with said native NTP time of the transmission of the third RTCP packet. The NTP timestamp value included in the third RTCP packet is generated by the packet processing device from a NTP timestamp value included in a RTCP packet from the first RTCP packet stream. Operation proceeds from step 1036 to optional step 1038.

In step 1038, the packet processing device receives a fourth RTCP packet containing an NTP timestamp value equal to the NTP timestamp value of the third RTCP packet. Operation proceeds from step 1038 to optional step 1039.

In step 1039, the packet processing device determines the native NTP time at which the fourth RTCP packet was received at the packet processing device. In some embodiments optional step 1039 includes optional step 1041. In step 1041, the storage control module of the packet processing device identifies in the memory the stored native NTP time at which the third RTCP packet was transmitted using the NTP timestamp value received in the fourth RTCP packet. Operation proceeds from step 1039 to optional step 1042.

In step 1042, the packet processing device generates a round trip time based on the stored native NTP time at which the third RTCP packet was transmitted from the packet processing device and the native NTP time at which the fourth RTCP packet was received at the packet processing device. Operation proceeds from step 1042 to optional step 1045. In step 1045, the storage control module of the packet processing device stores in memory the generated round trip time.

In some embodiments of the method 1001, the first RTCP packet NTP timestamp value indicates a first absolute time and said second RTCP packet NTP timestamp value indicates a second absolute time. In some of such embodiments, the first and second RTCP packet NTP timestamp values are the same and said first and second absolute times are the same while in some other embodiments the first and second RTCP packet NTP timestamp values are different and said first and second absolute times are different.

In some embodiments of the method 1001, the second RTP packets differ from the first RTP packets with respect to at least one of packet payload or included RTP timestamp values. For example, the content of the second RTP packets may be, and in some embodiments is, content from the first RTP packets that has been transcoded and/or transrated and/or the second RTP timestamp values may be and typically are different than the first RTP timestamp values for example due to a different initial RTP timestamp value which may have been randomly generated at the packet processing device.

In some embodiments of the method 1001, the timestamp values of the first and second RTP packet streams are different and the RTCP packet NTP timestamp values included in the first and second RTCP packet streams are different.

In some embodiments of the method 1001, the first RTP packet stream communicates content corresponding to a time period corresponding to a range of RTCP packet NTP timestamp values.

In some embodiments of the method 1001, the packets of the second RTP packet stream include content encoded using a different encoding standard then RTP packets included in said first RTP packet stream or which are encoded at a different coding rate.

In some embodiments of the method 1001, the RTP packets of the second RTP packet stream include the same encoded content as packets of the first RTP packet stream but different RTP timestamp values being associated with the same encoded content.

In some embodiments of the method 1001, the packet processing device is one of a transcoder device which recodes content, a transrating device which changes the data rate used to communicate content or a device which performs transcoding and transrating on content. In some of such embodiments, the packet processing device processes packets corresponding to audio packet streams, video packet streams or both audio and video packet streams.

In some of embodiments of the method 1001, the packet processing device processes one of an audio packet stream or a video packet stream corresponding to a program including audio and video content but not both.

In some embodiments of the present invention, the packet processing device 401 of FIG. 4 is the packet processing device that implements the various steps of the method 1001. In some of the embodiments, one or more modules of the assembly of modules 800 is included in the assembly of module 410 or 414 of the packet processing device 400 and perform one or more of the steps of the method 1001. The assembly of modules 800 includes a packet generation module 802, a communications interface, e.g., link interface, receiver module 804, a communications interface, e.g., link interface, transmitter module 806, a transcoder module 808, a control module 810, a transrater module 820, a memory module 822, a storage control module 824, an interpolation module 826, a RTP timestamp generation module 828, a RTCP native timestamp generation module 830, a NTP native time generation module 832, a RTCP NTP timestamp generation module 834, a determination module 836, a round trip time determination module 838, a round trip time generation module 840, and a recode module 842.

As shown in FIG. 9, the following exemplary data/information may be, and in some embodiments is, stored in the data/information section of memory 416 of the packet processing device 400 during the implementation of methods in accordance with various embodiments of the present invention: RTP packets from first RTP packet stream 902, information from RTP packets included in first RTP packet stream 904, first RTP timestamp values 905, RTCP packets from first RTCP packet stream 906, first packet from first RTCP packet stream 908, information from a first RTCP packet of the first RTCP packet stream correlating a first RTCP packet timestamp value to a RTP timestamp value of said first RTP packet stream 910, first RTCP timestamp values 912, RTP packets from second RTP packet stream 914, information from RTP packets included in the second RTP packet stream 916, second RTP timestamp values 918, RTCP packets from second RTCP packet stream 920, information from second RTCP packets of the second RTCP packet stream 922, a second RTCP packet from said second RTCP packet stream including a second RTCP NTP timestamp value which is associated with an RTP timestamp value of said second RTP packet stream 924, second RTCP timestamp values 926, packet processing device native NTP send time for a RTCP packet correlated to the RTCP packet NTP timestamp value included in a packet sent by the packet processing device 928, and a round trip time 930.

Figure 11:
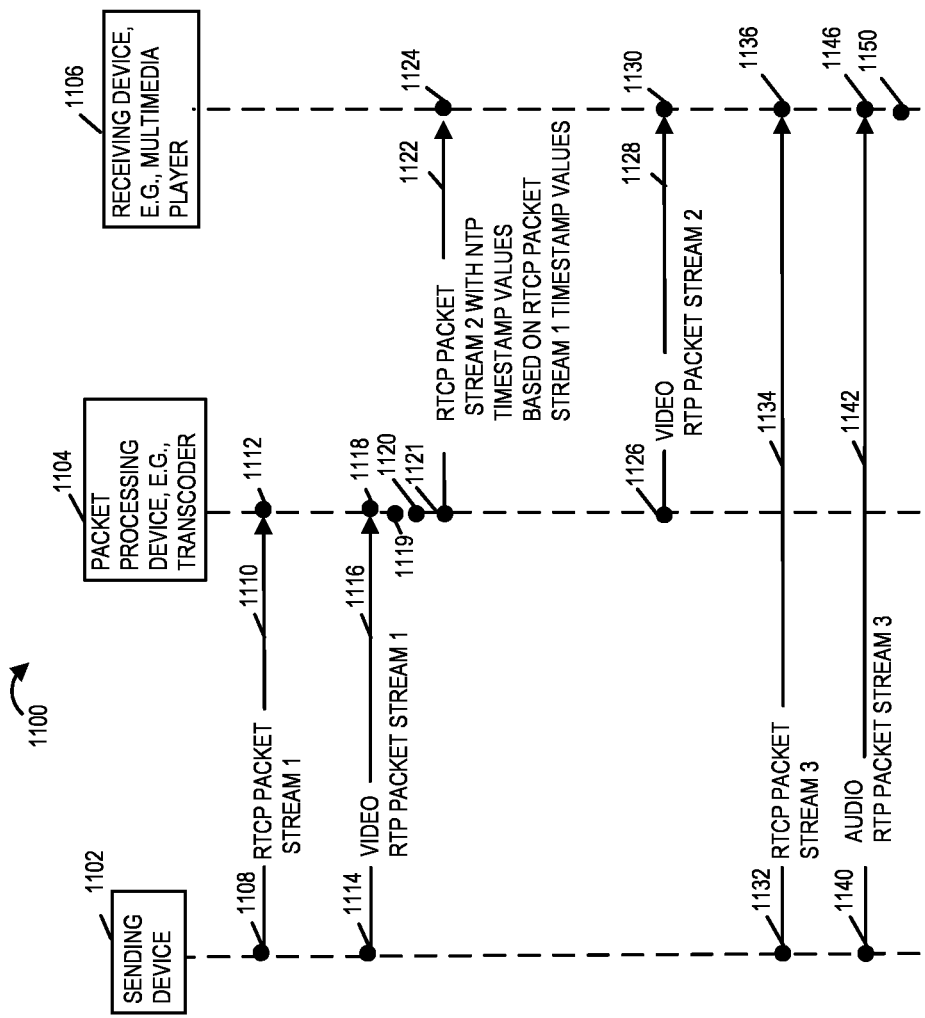
FIG. 11 illustrates an exemplary system in accordance with one embodiment of the present invention.

System 1100 of FIG. 11 illustrates an exemplary system in accordance with one embodiment of the present invention. The system 1100 includes a sending device 1102 a packet processing device 1104, e.g., a transcoder, and a receiving device 1106, e.g., a multi-media player. In some embodiments, the sending device 1102 is a multi-media device such as for example multi-media device 1500 of FIG.

15. In some embodiments, the receiving device 1106 is a multi-media device such as multi-media device 1500 of FIG. 15. In some embodiments, the packet processing device 1104 is implemented in accordance with the packet processing device 401 of FIG. 4 described above.

In system 1100 of FIG. 11, the sending device in step 1108 generates and transmits a first RTCP packet stream 1110 (also referred to as RTCP packet stream 1) to the packet processing device 1104. Operation proceeds from step 1108 to step 1112. In step 1112, the packet processing device 1104 receives the first RTCP packet stream 1110.

In step 1114, which may take place prior to, in parallel with or after step 1108, a first RTP packet stream 1116 (also referred to as RTP packet stream 1) is generated at the sending device 1102 and transmitted to the packet processing device 1104.

Operation proceeds from step 1114 to step 1118. In step 1118, the packet processing device 1104 receives the first RTP packet stream 1116. The first RTP packet stream 1116 in this example includes video content data. In some embodiments, the first RTP packet stream includes multi-media content. In some embodiments, the first RTP packet stream includes audio content.

Steps 1119 and 1120 may be, and in some embodiments, are performed in parallel. In step 1119, the packet processing device 1104 generates a second RTP packet stream 1128 (also referred to as RTP packet stream 2) based on the received packets of the first RTP packet stream 1116. In generating the second RTP packet stream 1128, the packet processing device performs a transcoding and/or transrating operation on the packets of the first RTP packet stream. In generating the second RTP packet stream 1128, the packet processing device generates new RTP timestamp values that are included in RTP packets of the second RTP packet stream 1128. In step 1120, the packet processing device 1104 generates a second RTCP packet stream 1122 (also referred to as RTCP packet stream 2) based on the received packets of the first RTCP packet stream 1110. Packets of the second RTCP packet stream 1122 include RTCP packet NTP timestamp values from the received packets of the first RTCP packet stream 1110 or based upon the received packets of the first RTCP packet stream 1110 and RTP timestamp values that correspond to the same instant in both the first and second RTP packet streams content. The RTP timestamp values included in the RTCP packets of the second RTCP packet stream may, and most instances are, different than the RTP timestamp values received in packets of the first RTP packet stream. The RTP timestamp values included in the packets of the second RTCP packet stream may be, but are not always, equal to RTP timestamp values included in the second RTP packet 1122.

In step 1121, packets of the second RTCP packet stream 1122 are transmitted from the packet processing device 1104 to the receiving device 1106. In step 1124, packets of the second RTCP packet stream are received by the receiving device 1106.

In step 1126, packets of the second RTP packet stream 1128 are transmitted from the packet processing device 1104 to the receiving device 1106. In step 1130, packets of the second RTP packet stream 1128 are received by the receiving device 1106.

In step 1132, which may take place prior to, in parallel with or after steps 1108 and 1114, the sending device 1102 generates and transmits a third RTCP packet stream 1134 (also referred to as RTCP packet stream 3). The third RTCP packet stream is transmitted to the receiving device 1106. In this example, the third RTCP packet stream bypasses the packet processing device 1104 and is sent directly to the receiving device 1106. As a result the RTCP packet NTP timestamp values and RTP timestamp values included by the sending device 1102 in the RTCP packets of the third RTCP packet stream during its generation will be unaltered when received by the receiving device 1106. Operation proceeds from step 1132 to step 1136. In step 1136 the receiving device 1106 receives the third RTCP packet stream 1134.

In step 1140, which may take place prior to, in parallel with or after steps 1108 1114, and 1132, the sending device 1102 generates and transmits a third RTP packet stream 1142 (also referred to as RTP packet stream 3). The third RTP packet stream is transmitted to the receiving device 1106. In this example, the third RTP packet stream includes audio content data. In some embodiments, the third RTP packet stream includes multi-media content data. In some embodiments the third RTP packet stream includes video content data. In this example, the third RTP packet stream bypasses the packet processing device 1104 and is sent directly to the receiving device 1106. As a result the RTP packet timestamp values included by the sending device 1102 in each of the RTP packets of the third RTP packet stream during its generation will be unaltered when received by the receiving device 1106. Operation proceeds from step 1142 to step 1146. In step 1146 the receiving device 1106 receives the third RTP packet stream 1142.

In some embodiments, the third RTCP packet stream and the third RTP packet stream instead of bypassing the packet processing device 1104 are transmitted to and received by the packet processing device 1104 which retransmits the third RTCP packet stream and the third RTP packet stream to the receiving device 1106 without altering the third RTCP packet stream or the third RTP packet stream.

In step 1150, the receiving device plays back the video and audio content from the second and third RTP packet streams. The playback of the video and audio content is synchronized by the receiving device 1106 using the RTCP NTP timestamp values in the packets of the second and third RTCP packet streams and RTP timestamps in the second and third RTCP and RTP packet streams. In this manner, the audio and video can be played back in a synchronized manner consistent with the original timestamp values. That is RTP time stamps which may have been generated as part of transcoding will still map to the original RTCP NTP timestamp values of the original RTCP and RTP packet streams given that the mapping of media content to RTCP NTP timestamps remains consistent despite the possible change in RTP timestamp values.

Figure 12:
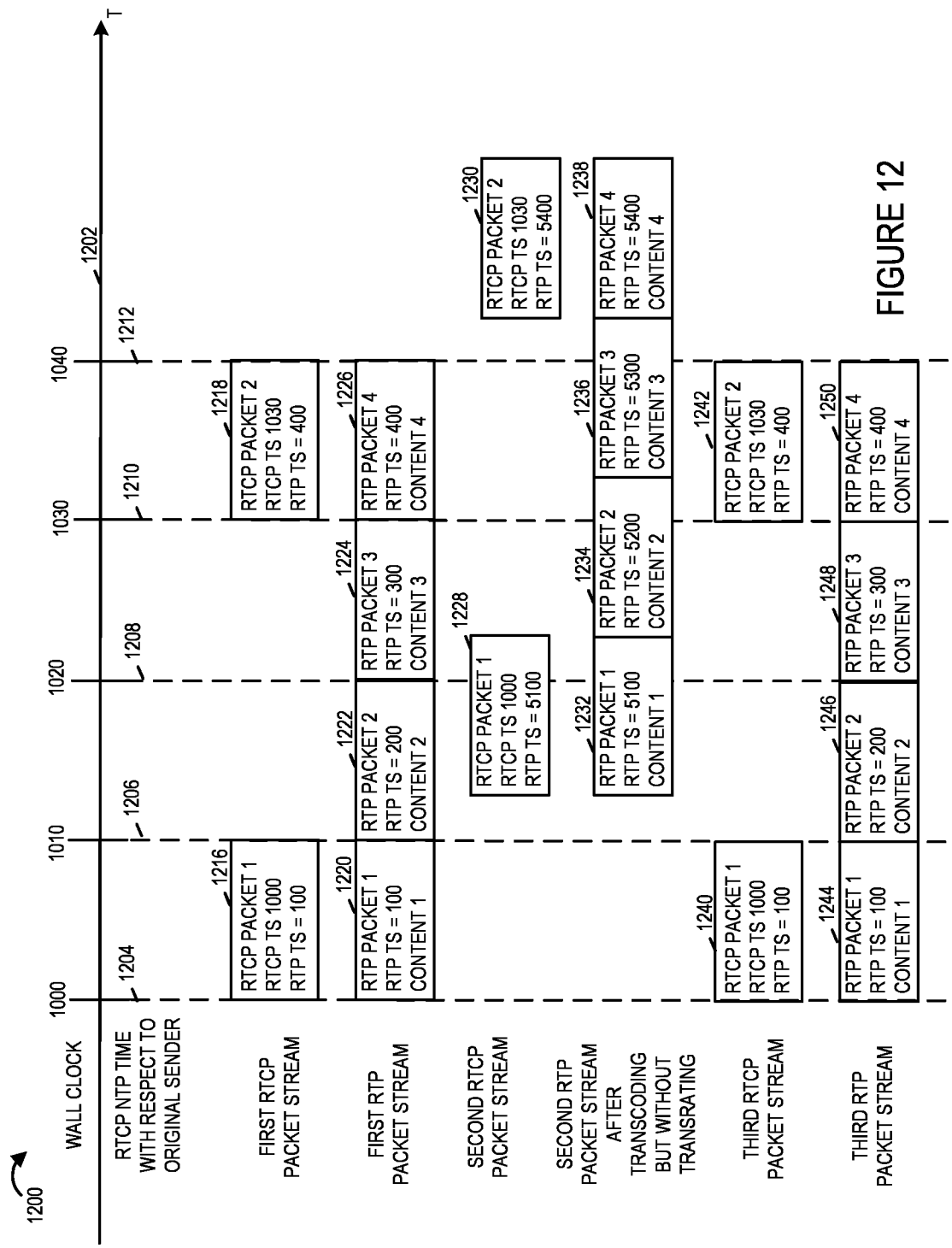
FIG. 12 illustrates various packet streams in accordance with an exemplary embodiment of the present invention.

Diagram 1200 of FIG. 12 illustrates an example of several packets from each packet stream discussed in connection with the exemplary system and method discussed in the exemplary embodiment illustrated in FIG. 11. Diagram 1200 of FIG. 12 illustrates several packets of the first RTCP packet stream, the first RTP packet stream, the second RTCP packet stream generated by the packet processing device 1104 based on the first RTCP packet stream, the second RTP packet stream generated by the packet processing device 1104 based on the first RTP packet stream using transcoding but without transrating, the third RTCP packet stream, and the third RTP packet stream. The various packets of the different packet streams are shown in view of a wall clock time line 1202 with times provided with respect to the original sender. The wall clock/NTP time 1202 with respect to the original sender, the RTCP NTP timestamp values, RTP timestamp values and content of the packets have been chosen for illustrative purposes and to simplify the example. The length of the packets do not represent the amount of data in the packet or the duration of the playback time to which the communicated data corresponds. The start location of the packet in connection with the time line 1202 indicates when it is output by its corresponding transmitting device, e.g., the packet processing device, with respect to the wall clock time of the original sending device 1102.

The timeline 1202 represents the wall clock or RTCP NTP time with respect to the original sender which is the sending device 1102. Dashed line 1204 represents the wall clock/NTP time of 1000 with respect to the original sender. Dashed line 1206 represents the wall clock/NTP time of 1010 with respect to the original sender. Dashed line 1208 represents the wall clock/NTP time of 1020 with respect to the original sender. The dashed line 1210 represents the wall clock/NTP time of 1030 with respect to the original sender. The dashed line 1212 represents the wall clock/NTP time of 1040 with respect to the original sender.

With respect to the first RTCP packet stream two RTCP packets are shown, RTCP packet 1 1216 and RTCP packet 2 1218. RTCP packet 1 1216 includes a RTCP packet NTP timestamp value=1000 and RTP timestamp value=100. RTCP packet 2 includes a RTCP packet NTP timestamp value=1030 and a RTP timestamp value=400. Packets from the first RTCP packet stream are generated by the sending device 1102 and sent in step 1108 of FIG. 11.

With respect to the first RTP packet stream which in the example discussed in connection with FIG. 11 was a video packet stream, four packets of the first RTP packet stream are illustrated in FIG. 12. The four packets of the first RTP packet stream shown in FIG. 12 are RTP packet 1 1220, RTP packet 2 1222, RTP packet 3 1224 and RTP packet 4 1226. RTP packet 1 1220 includes RTP timestamp value 100 and data content 1. RTP packet 2 1222 includes RTP timestamp value 200 and data content 2. RTP packet 3 1224 includes RTP timestamp value 300 and data content 3. RTP packet 4 1226 includes RTP timestamp 400 and data content 4.

The RTP timestamp value 100 in the RTCP packet 1 1216 corresponds to the NTP timestamp value 1000 in RTCP packet 1 1216 but in the same units and with the same random offset as the RTP timestamp values in the first RTP packet stream. In this example, the RTP packet 1 1220 which contains content 1 has a RTP timestamp value=100.

With respect to the second RTCP packet stream which is generated by the packet processing device 1104 in step 1120 of FIG. 11, two packets are shown RTCP packet 1 1228 and RTCP packet 2 1230 are shown in FIG. 12. The RTCP packet 1 1228 of the second RTCP packet stream is generated from the RTCP packet 1 1216 of the first RTCP packet stream. The RTCP packet 1 1228 NTP timestamp value is set to the value 1000 which is the value of the RTCP packet 1 1216 NTP timestamp value. While the RTCP NTP timestamp values in the second RTCP packet stream are consistent and fall in the range of RTCP NTP timestamp values included in the first RTCP stream (and in some instances such as the present example are the same as the values in the first RTCP stream), the RTP values are in the range of those generated by the packet processing device 1104. The RTCP packet 1 1228 RTP timestamp value is 5100. The RTCP packet 2 1230 of the second RTCP packet stream is generated from the RTCP packet 2 1218 of the first RTCP packet stream. The RTCP packet 2 1230 NTP timestamp value is set to the value 1030 which is the value of the RTCP packet 2 1218 NTP timestamp value. The RTCP packet 2 1230 RTP timestamp value is set to 5400.

The actual wall clock time NTP time value with respect to the original sender for the RTCP packet 1 1228 of the second RTCP stream is shown as approximately 1013 with respect to the time line 1202 which is the transmission time of the RTCP packet 1 1228 from the packet processing device 1104. The time from 1000 to 1013 represents transmission time for the RTCP packet 1216 to be sent from the sending device 1102 to the packet processing device 1104 and the time to receive the RTCP packet 1 1216, generate the RTCP packet 1 1228 based on the RTCP packet 1 1216, and transmit the RTCP packet 1 1228.

The actual wall clock time NTP time value with respect to the original sender for the RTCP packet 2 1230 of the second RTCP stream is shown as approximately 1043 with respect to the time line 1202 which is the transmission time of the RTCP packet 2 1230 from the packet processing device 1104. The time from 1030 to 1043 represents transmission time for the RTCP packet 1218 to be sent from the sending device 1102 to the packet processing device 1104 and the time to receive the RTCP packet 2 1218, generate the RTCP packet 2 1230 based on the RTCP packet 1 1218, and transmit the RTCP packet 2 1230.

With respect to the second RTP packet stream which is generated by the packet processing device 1104 in step 1119 of FIG. 11, four packets are shown RTP packet 1 1232, RTP packet 2 1234, RTP packet 3 1236, and RTP packet 4 1238 are shown in FIG. 12. RTP packet 1 1232, RTP packet 2 1234, RTP packet 3 1236 and RTP packet 4 1238 of the second RTP packet stream are generated by the packet processing device 1104 by transcoding but not transrating the four RTP packets 1220, 1222, 1224 and 1226 of the first RTP packet stream respectively.

The RTP packet 1 1232 of the second RTP packet stream is generated from the RTP packet 1 1220 of the first RTP packet stream. The RTP packet 1 1232 timestamp value is set to the value 5100 and the RTP packet 1 payload contains content 1 which is the same content as in RTP packet 1 1220 but has been recoded.

The RTP packet 2 1234 of the second RTP packet stream is generated from the RTP packet 2 1222 of the first RTP packet stream by the packet processing device 1104. The RTP packet 2 1234 timestamp value is set to the value 5200 and the RTP packet 2 1234 payload contains content 2 which is the same content as in RTP packet 2 1222 but has been recoded.

The RTP packet 3 1236 of the second RTP packet stream is generated from the RTP packet 3 1224 of the first RTP packet stream by the packet processing device 1104. The RTP packet 3 1236 timestamp value is set to the value 5300 and the RTP packet 3 1236 payload contains content 3 which is the same content as in RTP packet 3 1224 but has been recoded.

The RTP packet 4 1238 of the second RTP packet stream is generated from the RTP packet 4 1226 of the first RTP packet stream by the packet processing device 1104. The RTP packet 4 1238 timestamp value is set to the value 5400 and the RTP packet 4 1238 payload contains content 4 which is the same content as in RTP packet 4 1226 but has been recoded. Note that the RTP packets of the second RTP stream communicate content which is the same as, or generated from, content in the first RTP packet stream and will map to the same RTCP NTP timestamp values despite use of different RTP timestamp values in the first and second RTP streams. Thus the bindings of RTCP NTP timestamp values to RTP timestamp values provided by the second RTCP packet stream allows content in the second RTP stream to be mapped to the original wall clock used to generate the RTCP packets of the first RTCP stream and first RTP stream.

In FIG. 12 the RTP packet 1 1232 of the second RTP stream is shown as being transmitted by the packet processing device 1104 at time 1013 with respect to the sending device 1102 wall clock time. The RTP packet 2 1234 of the second RTP stream is shown as being transmitted by the packet processing device 1104 at time 1023 with respect to the sending device 1102 wall clock time. The RTP packet 3 1236 of the second RTP stream is shown as being transmitted by the packet processing device 1104 at time 1033 with respect to the sending device 1102 wall clock time. The RTP packet 4 of the second RTP stream is shown as being transmitted by the packet processing device 1104 at time 1043 with respect to the sending device 1102 wall clock time.

As with the transmission times of the RTCP packet 1 1228 and RTCP packet 2 1230 of the second RTCP packet stream, the transmission times of the packets of second RTP packet stream with respect to the wall clock time of the original sender as shown with respect to the time line 1202 represents transmission time for the RTP packets to be sent from the sending device 1102 to the packet processing device 1104 and the time to receive the RTP packets of the first RTP packet stream, generate the RTP packets of the second RTP based on the RTP packets of the first RTP stream, and transmit the RTP packets of the second RTP stream. In FIG. 12 the RTP packet 1 of the second RTP stream is shown as being transmitted by the packet processing device 1104 at time 1013 with respect to the sending device 1102 wall clock time.

With respect to the third RTCP packet stream two RTCP packets are shown, RTCP packet 1 1240 and RTCP packet 2 1242. RTCP packet 1 1240 includes a RTCP packet NTP timestamp value=1000 and RTP timestamp value=100. RTCP packet 2 includes a RTCP packet NTP timestamp value=1030 and a RTP timestamp value=400. Packets from the third RTCP packet stream are generated by the sending device 1102 and sent in step 1132 of FIG. 11.

With respect to the third RTP packet stream which in the example discussed in connection with FIG. 11 was an audio packet stream, four packets of the third RTP packet stream are illustrated in FIG. 12. These packets are generated and transmitted by the sending device 1102 in step 1140 shown in FIG. 11. The four packets of the third RTP packet stream shown in FIG. 12 are RTP packet 1 1244, RTP packet 2 1246, RTP packet 3 1248 and RTP packet 4 1250. RTP packet 1 1244 includes RTP timestamp value 100 and data content 1. RTP packet 2 1246 includes RTP timestamp value 200 and data content 2. RTP packet 3 1248 includes RTP timestamp value 300 and data content 3. RTP packet 4 1250 includes RTP timestamp 400 and data content 4. The RTP packets of the third packet stream and the RTP packets of the third RTP packet stream are sent directly from the sending device 1102 to the receiving device 1106 and so their RTCP NTP timestamp values, RTP timestamp values and data content remains unaltered.

In this example, the sending device 1102 synchronizes the video stream content carried in the first RTP packet stream with the audio content carried in the third RTP packet stream through the RTCP NTP timestamp values and RTP timestamp values included in the packets of the first and third RTCP packet streams and the RTP timestamp values included in the packets of the first and third RTP streams. The RTP timestamp values reflect the sampling instant for real time sampled data (or presentation time for the next unit of stored data) of the first octet in the associated RTP data packet. For each media (audio and video) sample the RTP timestamp is related to the sampling instant by pairing it with a timestamp from a reference clock (wallclock), i.e., NTP timestamp value, that represents the time when the data corresponding to the RTP timestamp was sampled (or is to be presented). In this example, the reference clock is the sending device 1102's wallclock which is used to generate the first and third NTP timestamp values. This pairing of NTP timestamp values with RTP timestamp values provides a binding between the RTP timestamps for the media (audio and video) packets to the RTCP NTP timestamp values of the wallclock of the sending device 1102. The pairing of the NTP timestamp values and RTP timestamp values is contained in the packets of the first and third RTCP packet streams. This information synchronizes the content data of the different media (audio and video) streams and allows presentation of all media (audio and video) sampled at the same time (or to be presented at the same time for stored data). When the packet processing device 1104 transcodes the packets of the first packet processing stream and generates the packets of the second RTCP packet stream and second RTP packet stream, it generates new RTP timestamp values that it maps to the original wall clock time of the sending device 1102 thereby maintaining synchronization of the data.

Because the mapping of the instants in time of data sampling (or presentation time) as it relates to the sending device's wallclock has been maintained by the second RTCP packet stream NTP timestamp value to second RTP packet stream timestamp value pairings included in the packets of the second RTCP packet stream, the video and audio content data of the second and third RTP packet streams remain synchronized. The receiving device 1106 plays back in step 1150 of FIG. 11 the video of the second RTP packet stream and the audio of the third RTP packet stream in synchronization using the NTP timestamp values and RTP timestamp values of the second and third RTCP and RTP packet streams which are referenced to the sending device 1102 wall clock.

Figure 13:
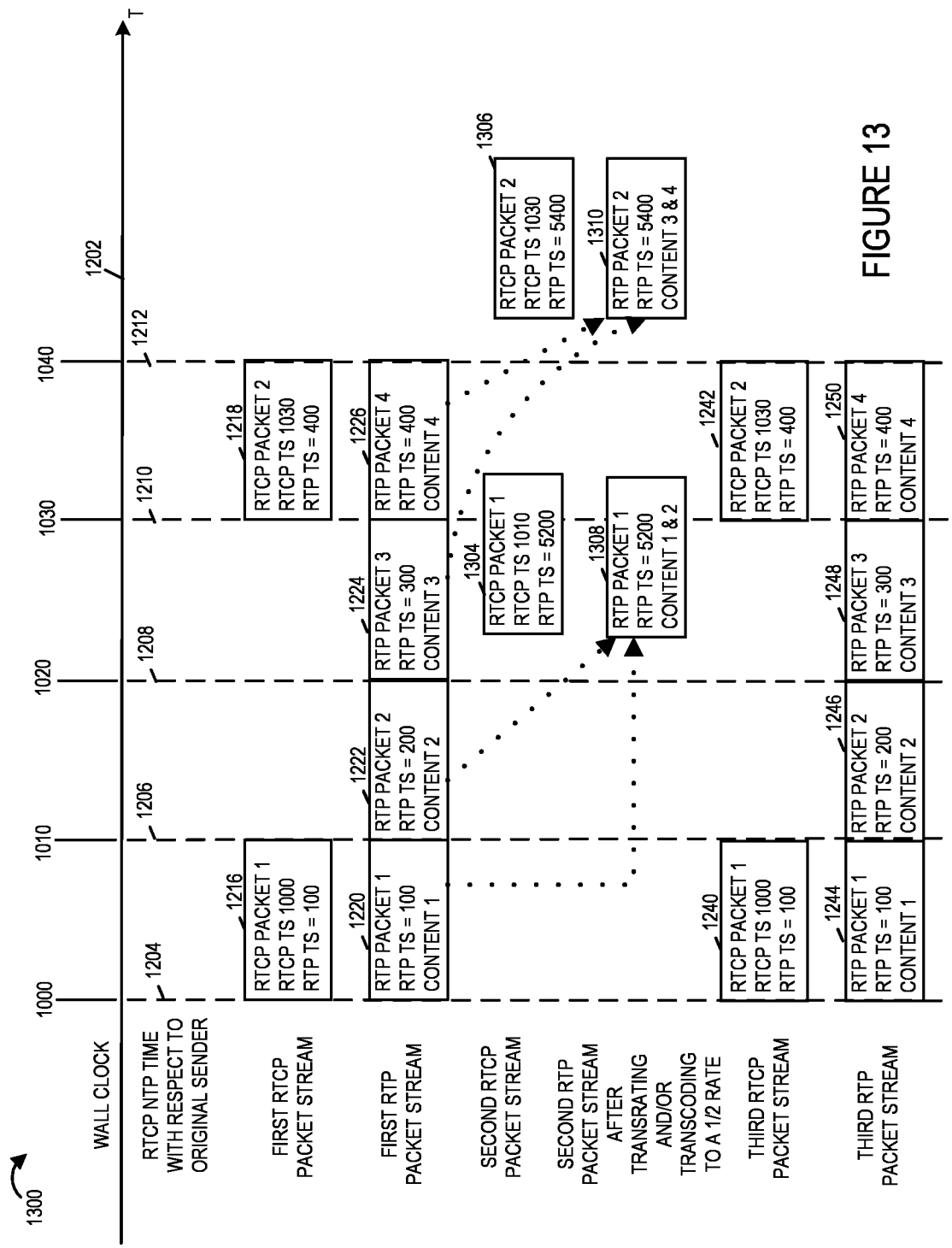
FIG. 13 illustrates various packet streams in accordance with an exemplary embodiment of the present invention.

Diagram 1300 of FIG. 13 illustrates another example of several packets from each packet stream discussed in connection with the exemplary system and method discussed in the exemplary embodiment illustrated in FIG. 11. Elements with the same reference numerals in FIG. 13 as those in FIG. 12 are the same or similar and will not be discussed in detail in connection with FIG. 13. In the example shown in FIG. 13, the packet processing device 1104 performs a transrating and/or transcoding operation on the packets of the first RTP packet stream to a 1/2 data rate.

Diagram 1300 of FIG. 13 illustrates several packets of the first RTCP packet stream, the first RTP packet stream, the second RTCP packet stream generated by the packet processing device 1104 based on the first RTCP packet stream, the second RTP packet stream generated by the packet processing device 1104 based on the first RTP packet stream using transrating and/or transcoding to a 1/2 rate, the third RTCP packet stream, and the third RTP packet stream. The various packets of the different packet streams are shown in view of a wall clock time line 1202 with times provided with respect to the original sender. The wall clock/NTP time 1202 with respect to the original sender, the RTCP NTP timestamp values, RTP timestamp values and content of the packets have been chosen for illustrative purposes and to simplify the example. The length of the packets do not represent the amount of data in the packet or the duration of the playback time to which the communicated data corresponds. The start location of the packet in connection with the time line 1202 indicates when it is output by its corresponding transmitting device, e.g., the packet processing device, with respect to the wall clock time of the original sending device 1102.

The timeline 1202 represents the wall clock or RTCP NTP time with respect to the original sender which is the sending device 1102. Dashed line 1204 represents the wall clock/NTP time of 1000 with respect to the original sender. Dashed line 1206 represents the wall clock/NTP time of 1010 with respect to the original sender. Dashed line 1208 represents the wall clock/NTP time of 1020 with respect to the original sender. The dashed line 1210 represents the wall clock/NTP time of 1030 with respect to the original sender. The dashed line 1212 represents the wall clock/NTP time of 1040 with respect to the original sender.

With respect to the first RTCP packet stream two RTCP packets are shown, RTCP packet 1 1216 and RTCP packet 2 1218. RTCP packet 1 1216 includes a RTCP packet NTP timestamp value=1000 and RTP timestamp value=100. RTCP packet 2 includes a RTCP packet NTP timestamp value=1030 and a RTP timestamp value=400. Packets from the first RTCP packet stream are generated by the sending device 1102 and sent in step 1108 of FIG. 11.

With respect to the first RTP packet stream which in the example discussed in connection with FIG. 11 was a video packet stream, four packets of the first RTP packet stream are illustrated in FIG. 13. The four packets of the first RTP packet stream shown in FIG. 13 are RTP packet 1 1220, RTP packet 2 1222, RTP packet 3 1224 and RTP packet 4 1226. RTP packet 1 1220 includes RTP timestamp value 100 and data content 1. RTP packet 2 1222 includes RTP timestamp value 200 and data content 2. RTP packet 3 1224 includes RTP timestamp value 300 and data content 3. RTP packet 4 1226 includes RTP timestamp 400 and data content 4.

The RTP timestamp value 100 in the RTCP packet 1 1216 corresponds to the NTP timestamp value 100 in RTCP packet 1 1216 but in the same units and with the same random offset as the RTP timestamp values in the first RTP packet stream. In this example, the RTP packet 1 1220 which contains content 1 has a RTP timestamp value=100.

With respect to the second RTCP packet stream which is generated by the packet processing device 1104 in step 1120 of FIG. 11, two packets are shown RTCP packet 1 1304 and RTCP packet 2 1306 in FIG. 13. The RTCP packet 1 1304 of the second RTCP packet stream is generated from the RTCP packet 1 1216 of the first RTCP packet stream. The RTCP packet 1 1304 NTP timestamp value is set to the value 1010 which is based on the RTCP packet 1 1216 NTP timestamp value but interpolation has been used to calculate the RTCP packet 1 1304 NTP timestamp value that will map to the transrated data with the paired RTP timestamp value of 5200 which is included in the RTCP packet 1 1304 packet. While the RTCP NTP timestamp values in the second RTCP packet stream are consistent and fall in the range of RTCP NTP timestamp values included in the first RTCP stream, the RTP values are in the range of those generated by the packet processing device 1104. The RTCP packet 1 1304 RTP timestamp value is 5200. The RTCP packet 2 1306 of the second RTCP packet stream is generated from the RTCP packet 2 1218 of the first RTCP packet stream. The RTCP packet 2 1306 NTP timestamp value is set to the value 1030 which is the value of the RTCP packet 2 1218 NTP timestamp value. The RTCP packet 2 1306 RTP timestamp value is set to 5400.

The actual wall clock time NTP time value with respect to the original sender for the RTCP packet 1 1304 of the second RTCP stream is shown as approximately 1023 with respect to the time line 1202 which is the transmission time of the RTCP packet 1 1304 from the packet processing device 1104. The time from 1000 to 1023 represents transmission time for the RTCP packet 1216 to be sent from the sending device 1102 to the packet processing device 1104 and the time to receive the RTCP packet 1 1216, generate the RTCP packet 1 1304 based on the RTCP packet 1 1216, and transmit the RTCP packet 1 1304.

The actual wall clock time NTP time value with respect to the original sender for the RTCP packet 2 1306 of the second RTCP stream is shown as approximately 1043 with respect to the time line 1202 which is the transmission time of the RTCP packet 2 1306 from the packet processing device 1104. The time from 1030 to 1043 represents transmission time for the RTCP packet 1218 to be sent from the sending device 1102 to the packet processing device 1104 and the time to receive the RTCP packet 2 1218, generate the RTCP packet 2 1306 based on the RTCP packet 1 1218, and transmit the RTCP packet 2 1306.

With respect to the second RTP packet stream which is generated by the packet processing device 1104 in step 1119 of FIG. 11, two packets, RTP packet 1 1308 and RTP packet 2 1310, are shown in FIG. 13. RTP packet 1 1308 and RTP packet 2 1310 of the second RTP packet stream are generated by the packet processing device 1104 by transrating and/or transcoding to a 1/2 rate the four RTP packets 1220, 1222, 1224 and 1226 of the first RTP packet stream.

The RTP packet 1 1308 of the second RTP packet stream is generated from the RTP packet 1 1220 and RTP packet 2 1222 of the first RTP packet stream. The RTP packet 1 1308 timestamp value is set to the value 5200 and the RTP packet 1 payload contains content 1 and 2 from the RTP packet 1 1220 and RTP packet 2 1222 that has been transrated and/or transcoded to a 1/2 rate.

The RTP packet 2 1310 of the second RTP packet stream is generated from the RTP packet 3 1224 and RTP packet 4 1226 of the first RTP packet stream by the packet processing device 1104. The RTP packet 2 1310 timestamp value is set to the value 5400 and the RTP packet 2 1310 payload contains content 3 and 4 which is the content from RTP packet 3 1224 and RTP packet 4 1226 but has been transrated and/or transcoded to a 1/2 rate.

As discussed in connection with the example of FIG. 12, the RTP packets of the second RTP stream communicate content which is the same as, or generated from, content in the first RTP packet stream and will map to the same RTCP NTP timestamp values despite use of different RTP timestamp values in the first and second RTP streams. Thus the bindings of RTCP NTP timestamp values to RTP timestamp values provided by the second RTCP packet stream allows content in the second RTP stream to be mapped to the original wall clock used to generate the RTCP packets of the first RTCP stream and first RTP stream.

In FIG. 13 the RTP packet 1 1308 of the second RTP stream is shown as being transmitted by the packet processing device 1104 at time 1023 with respect to the sending device 1102 wall clock time. The RTP packet 2 1310 of the second RTP stream is shown as being transmitted by the packet processing device 1104 at time 1043 with respect to the sending device 1102 wall clock time. As with the transmission times of the RTCP packet 1 1304 and RTCP packet 2 1306 of the second RTCP packet stream, the transmission times of the packets of second RTP packet stream with respect to the wall clock time of the original sender as shown with respect to the time line 1202 represents transmission time for the RTP packets to be sent from the sending device 1102 to the packet processing device 1104 and the time to receive the RTP packets of the first RTP packet stream, generate the RTP packets of the second RTP based on the RTP packets of the first RTP stream, and transmit the RTP packets of the second RTP stream. In FIG.

13 the RTP packet 1 of the second RTP stream is shown as being transmitted by the packet processing device 1104 at time 1023 with respect to the sending device 1102 wall clock time.

With respect to the third RTCP packet stream two RTCP packets are shown, RTCP packet 1 1240 and RTCP packet 2 1242. RTCP packet 1 1240 includes a RTCP packet NTP timestamp value=1000 and RTP timestamp value=100. RTCP packet 2 includes a RTCP packet NTP timestamp value=1030 and a RTP timestamp value=400. Packets from the third RTCP packet stream are generated by the sending device 1102 and sent in step 1132 of FIG. 11.

With respect to the third RTP packet stream which in the example discussed in connection with FIG. 11 was an audio packet stream, four packets of the third RTP packet stream are illustrated in FIG. 13. These packets are generated and transmitted by the sending device 1102 and sent in step 1140 shown in FIG. 11. The four packets of the third RTP packet stream shown in FIG. 13 are RTP packet 1 1244, RTP packet 2 1246, RTP packet 3 1248 and RTP packet 4 1250. RTP packet 1 1244 includes RTP timestamp value 100 and data content 1. RTP packet 2 1246 includes RTP timestamp value 200 and data content 2. RTP packet 3 1248 includes RTP timestamp value 300 and data content 3. RTP packet 4 1250 includes RTP timestamp 400 and data content 4. The RTCP packets of the third packet stream and the RTP packets of the third RTP packet stream are sent directly from the sending device 1102 to the receiving device 1106 and so their RTCP NTP timestamp values, RTP timestamp values and data content remains unaltered.

In this example, the sending device 1102 synchronizes the video stream content carried in the first RTP packet stream with the audio content carried in the third RTP packet stream through the RTCP NTP timestamp values and RTP timestamp values included in the packets of the first and third RTCP packet streams and the RTP timestamp values included in the packets of the first and third RTP streams. Even though the packet processing device 1104 transrates and/or transcodes the first RTP packet stream when generating the second RTP packet stream, the mapping of the data sampling times (or presentation times) between the content and the sending device 1102 wall clock time has been maintained during the generation of the second RTCP and RTP packet streams. Because the mapping of the instants in time of data sampling (or presentation time) as it relates to the sending device's wallclock is maintained by the second RTCP packet stream NTP timestamp value to second RTP packet stream timestamp value pairings included in the packets of the second RTCP packet stream, the video and audio content data of the second and third RTP packet streams remain synchronized. The receiving device 1106 plays back in step 1150 of FIG. 11 the video of the second RTP packet stream and the audio of the third RTP packet stream in synchronization using the NTP timestamp values and RTP timestamp values of the second and third RTCP and RTP packet streams which reference the sending device 1102 wall clock.

Figure 14:
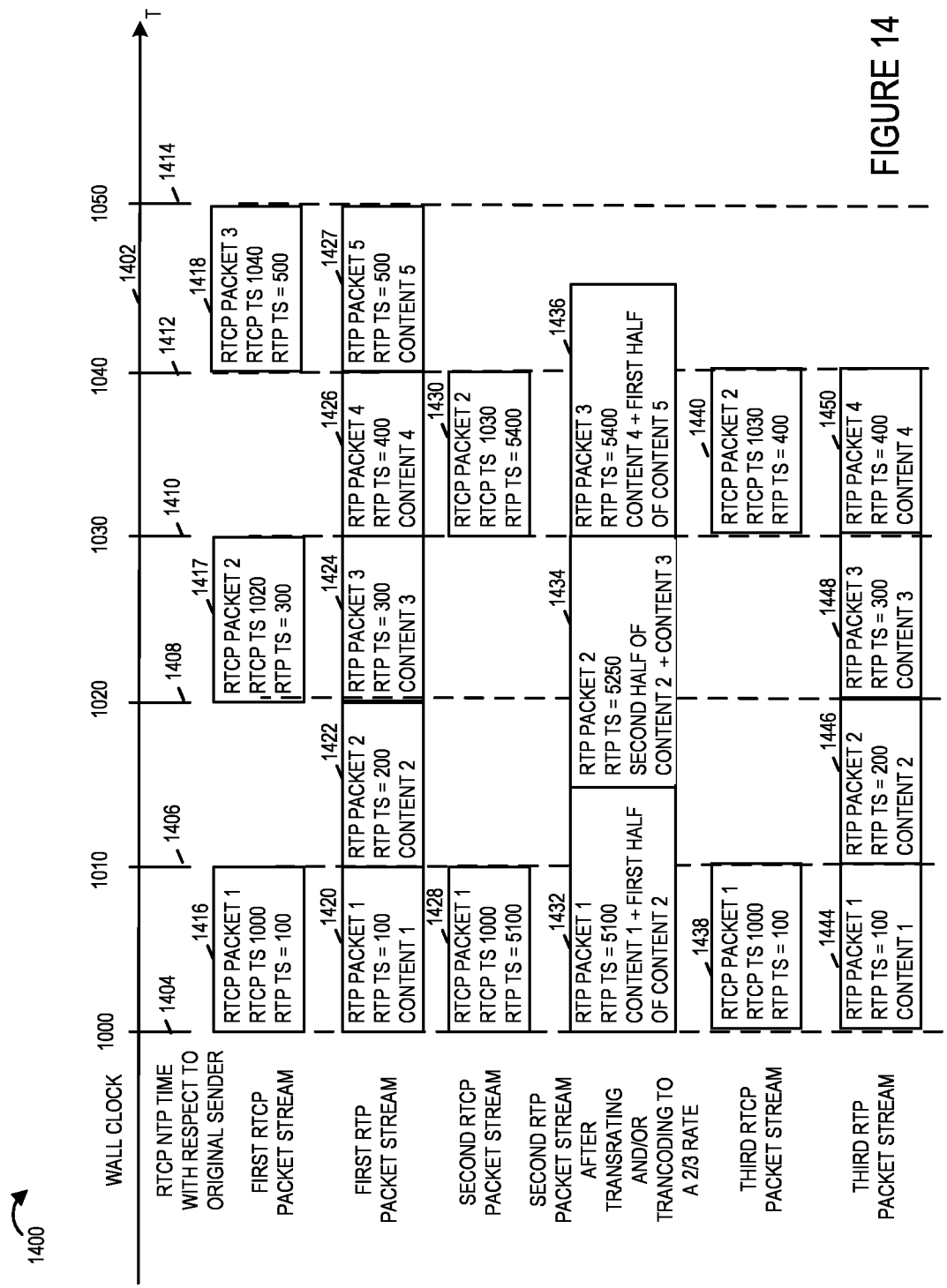
FIG. 14 illustrates various packet streams in accordance with an exemplary embodiment of the present invention.

Diagram 1400 of FIG. 14 illustrates another example of several packets from each packet stream discussed in connection with the exemplary system and method discussed in the exemplary embodiment illustrated in FIG. 11. In the example shown in FIG. 14, the packet processing device 1104 performs a transrating and/or transcoding operation on the packets of the first RTP packet stream to a 2/3 rate.

Diagram 1400 of FIG. 14 illustrates several packets of the first RTCP packet stream, the first RTP packet stream, the second RTCP packet stream generated by the packet processing device 1104 based on the first RTCP packet stream, the second RTP packet stream generated by the packet processing device 1104 based on the first RTP packet stream using transrating and/or transcoding to a 2/3 rate, the third RTCP packet stream, and the third RTP packet stream. The various packets of the different packet streams are shown in view of a wall clock time line 1402 with times provided with respect to the original sender. The wall clock/NTP time 1402 with respect to the original sender, the RTCP NTP timestamp values, RTP timestamp values and content of the packets have been chosen for illustrative purposes and to simplify the example. The length of the packets do not represent the amount of data in the packet or the duration of the playback time to which the communicated data corresponds. The start location of the packet in connection with the time line 1402 indicates when it is output by its corresponding transmitting device, e.g., the packet processing device, with respect to the wall clock time of the original sending device 1102. However, to make it easier to understand the 2/3 rate transrating/transcoding of the second RTP packet stream, the transmission times of the second RTCP and RTP packet streams do not reflect the transmission times of the second RTCP and RTP packets from the packet processing device 1104 as was done in FIGS. 12 and 13. For example, the transmission time and reception time of the first RTCP and RTP packets and the time to generate and transmit the packets of the second RTCP and RTP streams is not shown.

The timeline 1402 represents the wall clock or RTCP NTP time with respect to the original sender which is the sending device 1102. Dashed line 1404 represents the wall clock/NTP time of 1000 with respect to the original sender. Dashed line 1406 represents the wall clock/NTP time of 1010 with respect to the original sender. Dashed line 1408 represents the wall clock/NTP time of 1020 with respect to the original sender. The dashed line 1410 represents the wall clock/NTP time of 1030 with respect to the original sender. The dashed line 1412 represents the wall clock/NTP time of 1040 with respect to the original sender. The dashed line 1414 represents the wall clock/NTP time of 1050 with respect to the original sender.

With respect to the first RTCP packet stream three RTCP packets are shown, RTCP packet 1 1416, RTCP packet 2 1417 and RTCP packet 3 1418. RTCP packet 1 1416 includes a RTCP packet NTP timestamp value=1000 and RTP timestamp value=100. RTCP packet 2 includes a RTCP packet timestamp value=1020 and a RTP timestamp value=300, and RTCP packet 3 includes a RTCP packet NTP timestamp value=1040 and a RTP timestamp value=500. Packets from the first RTCP packet stream are generated by the sending device 1102 and sent in step 1108 of FIG. 11.

With respect to the first RTP packet stream which in the example discussed in connection with FIG. 11 was a video packet stream, five packets of the first RTP packet stream are illustrated in FIG. 14. The five packets of the first RTP packet stream shown in FIG. 14 are RTP packet 1 1420, RTP packet 2 1422, RTP packet 3 1424, RTP packet 4 1426 and RTP packet 5 1427. RTP packet 1 1420 includes RTP timestamp value 100 and data content 1. RTP packet 2 1422 includes RTP timestamp value 200 and data content 2. RTP packet 3 1424 includes RTP timestamp value 300 and data content 3. RTP packet 4 1426 includes RTP timestamp 400 and data content 4. RTP packet 5 1427 includes RTP timestamp 500 and data content 5.

The RTP timestamp value 100 in the RTCP packet 1 1416 corresponds to the NTP timestamp value 100 in RTCP packet 1 1416 but in the same units and with the same random offset as the RTP timestamp values in the first RTP packet stream. In this example, the RTP packet 1 1420 which contains content 1 has a RTP timestamp value=100.

With respect to the second RTCP packet stream which is generated by the packet processing device 1104 in step 1120 of FIG. 11, two packets, RTCP packet 1 1428 and RTCP packet 2 1430, are shown in FIG. 14. The RTCP packet 1 1428 of the second RTCP packet stream is generated from the RTCP packet 1 1416 of the first RTCP packet stream. The RTCP packet 1 1428 NTP timestamp value is set to the value 1000 which is based on the RTCP packet 1 1216 NTP timestamp value. While the RTCP NTP timestamp values in the second RTCP packet stream are consistent with and fall in the range of RTCP NTP timestamp values included in the first RTCP stream, the RTP values are in the range of those generated by the packet processing device 1104. The RTCP packet 1 1428 RTP timestamp value is 5100. The RTCP packet 2 1430 NTP timestamp value is set to the value 1030 which is generated based on the value of the RTCP packet 2 1417 NTP timestamp value but modified to accurately map the wallclock time of the original sending device 1102 and it's correlating data from the first RTP packet stream. The RTCP packet 2 1430 RTP timestamp value is set to 5400.

With respect to the second RTP packet stream which is generated by the packet processing device 1104 in step 1119 of FIG. 11, three packets, RTP packet 1 1432, RTP packet 2 1434 and RTP packet 3 1436, are shown in FIG. 14. RTP packet 1 1432 RTP packet 2 1434 and RTP packet 3 1436 of the second RTP packet stream are generated by the packet processing device 1104 by transrating and/or transcoding to a 2/3 rate the five RTP packets 1420 1422, 1424, 1426 and 1427 of the first RTP packet stream.

The RTP packet 1 1432 of the second RTP packet stream is generated from the RTP packet 1 1420 and RTP packet 2 1422 of the first RTP packet stream. The RTP packet 1 1432 timestamp value is set to the value 5100 and the RTP packet 1 payload contains content 1 and the first half of content 2 from the RTP packet 1 1420 and RTP packet 2 1422 that has been transrated and/or transcoded to a 2/3 rate.

The RTP packet 2 1434 of the second RTP packet stream is generated from the RTP packet 2 1422 and RTP packet 3 1426 of the first RTP packet stream by the packet processing device 1104. The RTP packet 2 1434 timestamp value is set to the value 5250 which is determined using interpolation and the RTP packet 2 1434 payload contains the second half of content 2 from the RTP packet 2 1422 and content 3 from RTP packet 3 1424 but has been transrated and/or transcoded to a 2/3 rate.

The RTP packet 3 1436 of the second RTP packet stream is generated from the RTP packet 4 1426 and RTP packet 5 1427 of the first RTP packet stream by the packet processing device 1104. The RTP packet 3 1436 timestamp value is set to the value 5400 which is determined using interpolation and the RTP packet 3 1436 payload contains the content 4 from the RTP packet 4 1426 and the first half of content 5 from RTP packet 5 1427 but has been transrated and/or transcoded to a 2/3 rate.

As discussed in connection with the example of FIG. 12, the RTP packets of the second RTP stream communicate content which is the same as, or generated from, content in the first RTP packet stream and will map to the same RTCP NTP timestamp values despite use of different RTP timestamp values in the first and second RTP streams. Thus the bindings of RTCP NTP timestamp values to RTP timestamp values provided by the second RTCP packet stream allows content in the second RTP stream to be mapped to the original wall clock used to generate the RTCP packets of the first RTCP stream and first RTP stream.

With respect to the third RTCP packet stream two RTCP packets are shown, RTCP packet 1 1438 and RTCP packet 2 1440. RTCP packet 1 1438 includes a RTCP packet NTP timestamp value=1000 and RTP timestamp value=100. RTCP packet 2 1440 includes a RTCP packet NTP timestamp value=1030 and a RTP timestamp value=400. Packets from the third RTCP packet stream are generated by the sending device 1102 and sent in step 1132 of FIG. 11.

With respect to the third RTP packet stream which in the example discussed in connection with FIG. 11 was an audio packet stream, four packets of the third RTP packet stream are illustrated in FIG. 14. These packets are generated and transmitted by the sending device 1102 and sent in step 1140 shown in FIG. 11. The four packets of the third RTP packet stream shown in FIG. 14 are RTP packet 1 1444, RTP packet 2 1446, RTP packet 3 1448 and RTP packet 4 1450. RTP packet 1 1444 includes RTP timestamp value 100 and data content 1. RTP packet 2 1446 includes RTP timestamp value 200 and data content 2. RTP packet 3 1448 includes RTP timestamp value 300 and data content 3. RTP packet 4 1450 includes RTP timestamp 400 and data content 4. The RTCP packets of the third packet stream and the RTP packets of the third RTP packet stream are sent directly from the sending device 1102 to the receiving device 1106 and so their RTCP NTP timestamp values, RTP timestamp values and data content remains unaltered.

In this example, the sending device 1102 synchronizes the video stream content carried in the first RTP packet stream with the audio content carried in the third RTP packet stream through the RTCP NTP timestamp values and RTP timestamp values included in the packets of the first and third RTCP packet streams and the RTP timestamp values included in the packets of the first and third RTP streams. Even though the packet processing device 1104 transrates and/or transcodes the first RTP packet stream when generating the second RTP packet stream, the mapping of the data sampling times (or presentation times) between the content and the sending device 1102 wall clock time has been maintained during the generation of the second RTCP and RTP packet streams. Because the mapping of the instants in time of data sampling (or presentation time) as it relates to the sending device's wallclock is maintained by the second RTCP packet stream NTP timestamp value to second RTP packet stream timestamp value pairings included in the packets of the second RTCP packet stream, the video and audio content data of the second and third RTP packet streams remain synchronized. The receiving device 1106 plays back in step 1150 of FIG. 11 the video of the second RTP packet stream and the audio of the third RTP packet stream in synchronization using the NTP timestamp values and RTP timestamp values of the second and third RTCP and RTP packet streams which reference the sending device 1102 wall clock.

The techniques of various embodiments may be implemented using software, hardware and/or a combination of software and hardware. Various embodiments are directed to apparatus and/or systems, e.g., communications device such as for example a packet processing device, multi-media, etc. Various embodiments are also directed to methods, e.g., a method of operating a communications device such as a packet processing device, multi-media device, transcoder, transrater, etc. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments devices described herein are implemented using one or more modules to perform the steps corresponding to one or more methods, for example, signal generation, signal transmission, signal reception, signal processing, and/or other steps. Thus, in some embodiments various features are implemented using modules. Such modules may be implemented using software, hardware, e.g., circuits, or a combination of software and hardware. In some embodiments, one or more modules are implemented by one or more processors configured to perform the modules functions. In some embodiments, one or modules are implemented in hardware specific circuits such as for example ASICs. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to an apparatus, e.g., a communications device such as a packet processing device including a processor configured to implement one, multiple or all of the steps of one or more methods of the invention.

In some embodiments, the processor or processors, e.g., CPUs, of one or more devices, e.g., of the communications device, e.g., packet processing device, are configured to perform the steps of the methods described as being performed by the apparatus. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., such as communications device, e.g., a packet processing device, with a processor which includes a module corresponding to each of the steps of the various described methods performed by the device in which the processor is included. In some but not all embodiments an apparatus, e.g., a communications device, e.g., a packet processing device, includes a module corresponding to each of the steps of the various described methods performed by the device in which the processor is included. The modules may be implemented using software and/or hardware. The hardware may be circuits, ASICs or other specialized or dedicated circuitry.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device, e.g., a packet processing device or multi-media device. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein.

Numerous additional variations on the methods and apparatus of the various embodiments described above will be apparent to those skilled in the art in view of the above description. Such variations are to be considered within the scope of the invention.

What is claimed is:

1. A method comprising:
 receiving packets of a first RTP packet stream at a packet processing device, the received packets of the first RTP packet stream including first RTP timestamp values;
 receiving packets of a first RTCP packet stream that corresponds to said first RTP packet stream at the packet processing device, a first packet in said first RTCP packet stream including information correlating a first RTCP NTP packet timestamp value to a RTP timestamp value of said first RTP packet stream;
 generating, at the packet processing device, from received RTP packets of said first RTP packet stream, a second RTP packet stream including RTP packets which are different from the RTP packets included in said first RTP packet stream, said generating a second RTP packet stream including generating second RTP timestamp values; and
 generating, at the packet processing device, a second RTCP packet stream from the received packets of the first RTCP packet stream, said second RTCP packet stream including a second RTCP packet including a second RTCP packet NTP timestamp value which is associated in said second RTCP packet with a RTP timestamp value of said second RTP packet stream, the second RTCP packet NTP timestamp value corresponding to content in said first and second RTP packet streams which is the same or content in said second RTP packet stream which was generated by transrating or transcoding content in said first RTP packet stream corresponding to said second RTCP packet NTP timestamp value.

2. The method of claim 1, wherein generating a second RTCP packet stream includes using at least some first RTCP packet NTP timestamp values received in said first RTCP packet stream as second RTCP packet NTP timestamp values in said second RTCP packet stream.

3. The method of claim 1, wherein generating the second RTCP packet stream includes:
 including one of the RTCP packet NTP timestamp values from the first RTCP packet stream in the second RTCP packet and a new RTP timestamp value, said new RTP timestamp value corresponding to a packet in the second RTP packet stream communicating data generated from a RTP packet of the first RTP packet stream which included a RTP timestamp value which is different from said new RTP timestamp value but which communicated content corresponding to said one of the RTCP packet NTP timestamp values.

4. The method of claim 3, wherein individual packets in said second RTP packet stream include content corresponding to the same length of time as individual packets in said first RTP packet stream.

5. The method of claim 1, wherein individual packets in said second RTP packet stream include content corresponding to different amounts of time than individual packets in said first RTP packet stream; and
wherein generating a second RTCP packet stream includes generating new RTCP packet NTP timestamp values for inclusion in said second RTCP packet stream based on the amount of time to which content in the second RTP packet stream corresponds.

6. The method of claim 5 further including: generating said new RTCP packet NTP timestamp values for inclusion in said second RTCP packet stream further based on the content included in said RTP packets in the second RTP packet stream, said second RTCP packet NTP timestamp values being generated such that a RTCP packet NTP timestamp value corresponds to the same content in either of the first or second RTP packet streams.

7. The method of claim 1, wherein said packet processing device uses interpolation to generate at least one of the RTCP packet NTP timestamp values of the second RTCP packet stream.

8. The method of claim 1, wherein said second RTCP packet stream includes a RTCP packet NTP timestamp value generated using interpolation.

9. The method of claim 1 further including:
storing, in memory at the packet processing device, a native NTP time at which a third RTCP packet of the second RTCP packet stream was transmitted from the packet processing device;
storing, in memory at the packet processing device, a NTP timestamp value included in the third RTCP packet of the second RTCP packet stream, said stored NTP timestamp value being associated with said native NTP time of the transmission of the third RTCP packet;
receiving, at the packet processing device, a fourth RTCP packet containing a NTP timestamp value equal to the NTP timestamp of the third RTCP packet;
determining, at the packet processing device, the native NTP time at which the fourth RTCP packet was received at the packet processing device; and
generating a round trip time based on the stored native NTP time at which the third RTCP packet was transmitted from the packet processing device and the native NTP time at which the fourth RTCP packet was received at the packet processing device.

10. The method of claim 1 further including:
receiving, at a multi-media device, said second RTCP packet stream, said second RTP packet stream, and a third RTP packet stream, said third RTP packet stream being different than said first and said second RTP packet streams;
synchronizing the play back, at said multi-media device, of multi-media content included in said second and said third RTP packet streams.

11. The method of claim 1, further comprising:
generating one of said RTP packets in said second RTP packet stream which is different from RTP packets included in said first RTP packet stream from a corresponding RTP packet in the first packet stream; and
wherein generating one of said RTP packets in said second RTP packet stream which is different from RTP packets included in said first RTP packet stream includes:
including an RTP time stamp in said one of said RTP packets in said second RTP packet stream which is different from an RTP time stamp included in the corresponding RTP packet in the first RTP packet stream from which said one of said RTP packets in said second RTP packet stream is generated.

12. A packet processing apparatus comprising:
an I/O interface configured to: (i) receive packets of a first RTP packet stream including first RTP timestamp values, and (ii) receive packets of a first RTCP packet stream that corresponds to said first RTP packet stream, a first packet in said first RTCP packet stream including information correlating a first RTCP NTP packet timestamp value to a RTP timestamp value of said first RTP packet stream;
a packet generation module configured to: (i) generate from the received RTP packets of said first RTP packet stream, a second RTP packet stream including RTP packets which are different from the RTP packets included in said first RTP packet stream, said RTP packets of the second RTP packet stream including second RTP timestamp values generated by said packet generation module; and (ii) generate a second RTCP packet stream from the received RTCP packets of the first RTCP packet stream, said second RTCP packet stream including a second RTCP packet including a second RTCP packet NTP timestamp value which is associated in said second RTCP packet with a RTP timestamp value of said second RTP packet stream, the second RTCP packet NTP timestamp value corresponding to content in said first and second RTP packet streams which is the same or content in said second RTP packet stream which was generated by transrating or transcoding content in said first RTP packet stream corresponding to said second RTCP packet NTP timestamp value.

13. The packet processing apparatus of claim 12, wherein said packet generation module is further configured to generate said second RTCP packet stream using at least some first RTCP packet NTP timestamp values received in said first RTCP packet stream as second RTCP packet NTP timestamp values in said second RTCP packet stream.

14. The packet processing apparatus of claim 12, wherein said packet generation module is further configured to:
include one of the RTCP packet NTP timestamp values from the first RTCP packet stream in the second RTCP packet and a new RTP timestamp value, said new RTP timestamp value corresponding to a packet in the second RTP packet stream communicating data generated from a RTP packet of the first RTP packet stream which included a RTP timestamp value which is different from said new RTP timestamp value but which communicated content corresponding to said one of the RTCP packet NTP timestamp values.

15. The packet processing apparatus of claim 14, wherein individual packets in said second RTP stream include content corresponding to the same length of time as individual packets in said first RTP stream.

16. The packet processing apparatus of claim 15, wherein individual packets in said second RTP packet stream include content corresponding to different amounts of time than individual packets in said first RTP packet stream; and wherein said packet generation module is further configured to generate new RTCP packet NTP timestamp values for inclusion in said second RTCP packet stream based on the amount of time to which content in the second RTP packet stream corresponds.

17. The packet processing apparatus of claim 16 wherein said packet generation module is further configured to generate said new RTCP packet NTP timestamp values for inclusion in said second RTCP packet stream based on the content included in said RTP packets in the second RTP packet stream, said second RTCP packet NTP timestamp values being generated such that a RTCP packet NTP timestamp value corresponds to the same content in either of the first or second RTP packet streams.

18. The packet processing apparatus of claim 14,
wherein said packet processing apparatus is a semiconductor chip;
wherein said one of the RTCP packet NTP timestamp values from the first RTCP packet stream included in the second RTCP packet was generated by a source device from which the first RTP packet stream and first RTCP packet stream originated; and
wherein all of the NTP timestamp values included in packets of said first RTCP packet stream are generated by said source device.

19. The packet processing apparatus of claim 12, wherein said packet generation module is further configured to use interpolation to generate at least one of the RTCP packet NTP timestamp values of the second RTCP packet stream.

20. The packet processing apparatus of claim 12, wherein said packet generation module is further configured to generate said second RTCP packet stream to include a RTCP packet NTP timestamp value generated using interpolation.

21. The packet processing apparatus of claim 12 further comprising:
memory;
a clock;
a storage control module configured to store in the memory a native NTP time generated by the clock and corresponding to the instant that a third RTCP packet of the second RTCP packet stream is transmitted from the packet processing apparatus;
a NTP time storage module configured to store in memory the NTP timestamp value included in the third RTCP packet, said stored NTP timestamp value being associated with said native NTP time of the transmission of the third RTCP packet;
an I/O interface configured to receive, at the packet processing apparatus, a fourth RTCP packet containing a NTP timestamp value equal to the NTP timestamp value included in the third RTCP packet;
a determination module configured to determine the native NTP time at which the fourth RTCP packet was received at the packet processing apparatus; and
a round trip time determination module configured to determine a round trip time from when the third RTCP packet of the second RTCP packet stream was transmitted from the packet processing apparatus to when the fourth RTCP packet was received by the packet processing apparatus based on the stored native NTP time at which the third RTCP packet was transmitted from the packet processing device and the native NTP time at which the fourth RTCP packet was received at the packet processing device.

22. The packet processing apparatus of claim 12 wherein said I/O interface is further configured to receive a third RTP packet stream and includes a transmitter, said transmitter configured to transmit to a multi-media device said second RTCP packet stream, said second RTP packet stream, and said third RTP packet stream, said third RTP packet stream being different than said first and said second RTP packet streams and said multi-media device configured to synchronize the play back of the multi-media content included in said second and said third RTP packet streams using timestamp information included in said second RTCP packet stream.

23. A method comprising:
receiving, at a packet processing device, a first RTP packet originating from a source sending device, said first RTP packet including data content of a first type and a first timestamp value generated by the source sending device, said packet processing device being an intermediary device on the path between the source sending device and a destination device;
receiving, at the packet processing device, a first RTCP message originating from the source sending device and corresponding to the first RTP packet, said first RTCP message including the first timestamp value and a first sender wall clock timestamp value generated by the source sending device;
storing, at the packet processing device, the time at which the first RTCP message was received at the packet processing device;
generating, at the packet processing device, a second RTP packet based on said received first RTP packet, said second RTP packet including a second timestamp value generated by the packet processing device;
generating, at the packet processing device, a second RTCP message based on said received first RTCP message and the stored reception time of the first RTCP message, said second RTCP message corresponding to the second RTP packet and including the second RTP timestamp;
wherein generating the second RTCP message includes when it is time to egress the second RTCP message from the packet processing device generating an NTP timestamp value to be included in the second RTCP message by determining the difference between a current time at the packet processing device and the stored reception time of the first RTCP packet and adding the determined difference between the current time and the stored reception time of the first RTCP packet to the first sender wall clock timestamp value generated by the source sending device;
transmitting, by the packet processing device, said second RTP packet to the destination device; and
transmitting, by the packet processing device, said second RTCP message to the destination device.

* * * * *